(12) United States Patent
Krone et al.

(10) Patent No.: US 6,925,790 B1
(45) Date of Patent: Aug. 9, 2005

(54) HARVESTING EQUIPMENT FOR STALK PLANTS

(75) Inventors: Bernard Krone, Spelle (DE); Wilhelm Ahler, Stadtlohn (DE); Alfons Keller, Mettingen (DE)

(73) Assignee: Maschinenfabrik Bernard Krone GmbH, Spelle (DE)

( * ) Notice: Subject to any disclaimer, the term of this patent is extended or adjusted under 35 U.S.C. 154(b) by 0 days.

(21) Appl. No.: 10/018,305

(22) PCT Filed: Jul. 19, 2000

(86) PCT No.: PCT/EP00/06885

§ 371 (c)(1),
(2), (4) Date: Aug. 21, 2002

(87) PCT Pub. No.: WO01/05218

PCT Pub. Date: Jan. 25, 2001

(30) Foreign Application Priority Data

| | | |
|---|---|---|
| Jul. 19, 1999 | (DE) | 199 33 777 |
| Jul. 19, 1999 | (DE) | 199 33 778 |
| Jul. 19, 1999 | (DE) | 199 33 779 |
| Jul. 19, 1999 | (DE) | 199 33 780 |
| Sep. 30, 1999 | (DE) | 199 47 288 |
| Oct. 26, 1999 | (DE) | 199 51 459 |
| Oct. 26, 1999 | (DE) | 199 51 636 |
| Nov. 1, 1999 | (DE) | 199 52 566 |

(51) Int. Cl.[7] ............................................. A01D 45/02
(52) U.S. Cl. ................................... 56/51; 56/93
(58) Field of Search ........................... 56/93, 14.3, 51, 56/92

(56) References Cited

U.S. PATENT DOCUMENTS

| | | | | |
|---|---|---|---|---|
| 822,395 | A * | 6/1906 | Smith | 198/712 |
| 1,896,711 | A * | 2/1933 | Lichtenberg | 37/465 |
| 3,462,927 | A * | 8/1969 | Quick | 56/56 |
| 3,656,285 | A * | 4/1972 | Carlson | 56/244 |
| 3,894,382 | A * | 7/1975 | Jauss | 56/14.3 |
| 4,771,592 | A * | 9/1988 | Krone et al. | 56/14.3 |
| 5,040,362 | A * | 8/1991 | Morgan et al. | 56/93 |
| 5,237,804 | A * | 8/1993 | Bertling | 56/60 |
| 5,875,624 | A * | 3/1999 | Olinger | 56/244 |
| 6,032,444 | A * | 3/2000 | Herron et al. | 56/60 |

FOREIGN PATENT DOCUMENTS

| | | | | |
|---|---|---|---|---|
| EP | 0541173 A1 | * | 11/1992 | 56/93 |
| EP | 541173 A1 | * | 5/1993 | A01D 45/02 |

* cited by examiner

*Primary Examiner*—Thomas B. Will
*Assistant Examiner*—Alicia Torres
(74) *Attorney, Agent, or Firm*—Jordan and Hamburg LLP

(57) ABSTRACT

A harvesting apparatus for harvesting corn or other such stalked vegetation includes at least one circulating endless conveyor for gathered plants, which forms an area at an end thereof for delivery of the plants to an inlet opening of a further processing apparatus. The endless conveyor includes conveyor links articulated to one another and at least one cutting plane comprising outwardly pointing cutters and having above it at least one holding plane for holding the cut stalks and including lower, outwardly-pointing holders. The endless conveyor is constructed such that a front side thereof, facing the cutters and holders, is of a substantially closed configuration.

63 Claims, 17 Drawing Sheets

HARVESTING EQUIPMENT FOR STALK PLANTS

BACKGROUND OF THE INVENTION

The invention relates to harvesting equipment for harvesting corn or similar stalked plants. Such harvesting equipment, designed especially as a front-end apparatus for a mobile processing apparatus, such as a chopper, serves for gathering, cutting off and transferring corn plants, for example, to the further processing apparatus. In DE 33 24 899 C2, a machine is disclosed for harvesting stalked plants, in which the plants are gathered by a front-end cutting machine, cut off and fed to a chopper. The gathering and cutting apparatus has a chain system circulating across the line of travel. The chain system consists of two conventional endless long-link roller chains whose holding fingers are associated with anvils and with stationary knives cooperating with counter-knives for cutting off and carrying the stalked corn plants. The chains have tongues above and below them, between which are open spaces defined by vertical pins. The stationary knives mounted underneath the chain system, and the knife holders corresponding thereto form a planar slide surface to guide the chain system. In order to achieve reliable guidance of the cornstalks after they are cut off, holding fingers and anvils are provided so that the cornstalks can be fed to the chopper by simultaneous contact with the holding fingers and the anvil in a position slightly inclined from the perpendicular. Not until the cornstalks are near the point where the chain movement reverses are they released by the fact that, due to the turning of the upper and lower long-link roller chain about sprockets positioned on different axes, the release of the holding action produced by holding fingers and anvils is brought about. A principal shortcoming of the conveying and cutting system described above is that, under the conditions of operation prevailing in its use (contact with earth, water and plant remnants), sufficient resistance to wear, especially of the long-link roller chains, cannot be achieved. The chains jam and lose their carrying ability. Replacement of individual chain links is also quite complicated due to the great number of parts.

SUMMARY OF THE INVENTION

The invention is addressed to the problem of creating a harvester for harvesting corn or other such stalked plants, with which the plants can be cut off over great working widths in a trouble-free manner and fed to an adjoining processing apparatus. The harvester achieves a satisfactory useful life even under the severe operating conditions of agriculture.

The above objects of the invention are achieved with a harvester which includes at least one circulating endless conveyor for gathered plants, having at an end a delivery area for delivering the harvested plants to an inlet opening of a further processing apparatus. The endless conveyor comprises conveyor links articulated to one another, and at least one lower cutting plane including outwardly pointing cutting means and at least one holding plane above it comprising outwardly pointing holding means for holding the cut stalks. A front side of the endless conveyor facing the cutting and holding means is made to be substantially closed.

In the harvester according to the invention, any penetration of plant remnants or soil into the links of the endless conveyor is virtually entirely prevented. Due to the closed front surfaces, the endless conveyor is constructed like an encapsulated unit, in which an internal drive of the endless conveyor or conveyors can operate without being adversely affected by plant or soil remnants.

If two holding levels are provided one above the other, the severed stalks can advantageously be transported in a virtually perpendicular position transversely of their length, in which case the space between the holding levels is also closed off, so that no leaves, which extend outwardly from the lower part of the stalks, can penetrate into the chain. If an upper holding level is offset in the working position from the lower one in the line of travel, the mowed stalks are prevented from tilting forward in front of the working length of the endless conveyor, where they would interfere with the harvesting operation. Instead, the stalks are transported in this manner in a slightly rearwardly inclined position.

If the endless conveyor is constructed as a single working unit, that is, in one piece overall or having parts permanently joined together, the result is a simple structural form of the conveyor links. They can be replaced without problems. In the case of a plurality of assembled parts for the formation of a conveyor element, they can be secured against rotation by interlocking and can be affixed to one another with only a single central bolt, which facilitates assembly in the manufacturing process and in maintenance and replacement. Multiplicity of parts, as was the case with open link chains, is thereby avoided.

Also, deflection shields for the formation of the closed front face are advantageously integrated into the conveyor links and form a fixed component of each conveyor link.

In accordance with a particularly advantageous embodiment, the deflection shields are configured so that, in the entrance to a chopper or the like, they form a continuous curved track free of indentations. If the delivery area is formed, for example, by a large sprocket wheel on the back of the endless conveyor, the curved track can curve following the radius of this sprocket wheel. For this purpose, the individual deflection shields each have a shape that bulges forward, so that together they form an arch in the delivery area. If, in the delivery area, a parallel position of the conveyor links is created, for example, by two end sprockets, a flat shape of the deflection shields can be achieved as an alternative.

Due to the continuous, uninterrupted curve of the track, it is possible to provide strippers for the endless conveyors in the delivery area, which then can be immobile and be each at a constant distance from the deflection shields of the conveyor links.

Particularly advantageously, these strippers are disposed on both sides of the inlet opening of the further processing apparatus and form lateral guiding surfaces for the plants. The feeding of plants to the chopper is virtually loss-free.

If flat bodies are formed in the holding planes and have projections in the plane of the flat body as drivers, the drivers can be made in one piece with the flat bodies, which offers especially great stability and can be achieved at considerably less trouble than, for example, welding the drivers to portions of the conveyor links.

The links can be made entirely as one-piece castings.

Of special importance for the trouble-free gathering and guiding of the stalked plants by the conveying and guiding elements of the endless conveyor is the shape of the gaps between the projections, which serve as recesses to contain the severed stalks, as are also the spatial arrangement of the flat bodies of the middle and upper conveying and guidance planes. In an advantageous embodiment, the edges of a projection, defining the gaps and leading in the direction of rotation of the endless conveyor and of a projection situated in the upper conveying and guiding plane, and trailing in the direction of rotation of the endless conveyor, are parallel to one another. For example, a cornstalk engaged by these edges assumes a position tilted against the direction of rotation of the endless conveyor. Furthermore, it is provided that the edges defining the gap to receive the stalked plants are disposed at an acute angle to a plane at the particular flat body, passing through the end pivot axes of each conveying and guiding element and, with that, parallel to the direction of rotation of the endless conveyor. Thus, a holding effect is produced for the stalked plants, which are in the gaps between the projections. By means of this holding effect, a reliable and thus trouble-free transfer of the severed stalked plants to a downstream processing apparatus, in the nature of a chopper unit, can be achieved. An advantageous shape of a projection situated in the middle conveying and guiding plane is obtained if this projection, as seen from one of the conveying and guiding planes, assumes the shape of a rectangle (parallelogram) shifted against the direction of rotation of the endless conveyor, possibly with rounded corners, while in the upper conveying and guiding plane, a projection with a triangular shape is preferred.

Within the scope of the invention, however, still other embodiments of the gaps between the projections of the flat bodies in the middle and upper conveying and guiding planes are conceivable for receiving the stalked plants. For example, it is possible to provide the flat bodies with two projections each, in which the edges defining the gaps are aligned either approximately parallel to one another and/or the distances between the edges defining the gaps become greater as seen in the conveying and working direction.

According to another advantageous aspect of the invention, circular segments are assigned at the leading side in the direction rotation of the endless conveyor and circular recesses at the trailing side to the drivers and their holding bodies in the lower conveying and guiding plane and the flat bodies in the middle and upper conveying and guiding plane. These segments and recesses mesh with one another with slight clearance when the conveyor links are in the connected state. The result is, on the one hand, simple and effective shields for the protection of bearing elements between each pair of conveyor links and, on the other hand, this method of construction prevents the formation of protruding edges on concatenated conveying and guiding elements which can lead to trouble in the harvesting process.

Another advantageous aspect lies in the nature of the connection between the concatenated conveying and guiding links of an endless conveyor. A swiveling connection can be created between two adjacent conveying and guiding elements, in which sliding friction, which tends to produce much wear in dirty connections, does not occur. To achieve this, the conveying and guiding link has a bearing housing, in which bearing elements in the form of sealed rolling bearings are contained, on the side, which is trailing in the direction of rotation of the endless conveyor. To simplify work in the assembly of an endless conveyor so constructed, the conveyor links will be designed so that they can be assembled from a lower and an upper section and fastened. This makes it possible, in assembling the sections, for a pin associated with the upper section and held therein to engage in a bearing of the lower section of a conveyor link leading with reference to the direction of rotation of the endless conveyor and containing a bearing element. Both sections can then be joined together by a screwed joint. The bearing elements can, in that case, be sealed rolling bearings, wherein sealed grooved ball bearings are preferably used.

The bearing cases simultaneously form teeth for engagement by a driving wheel having recesses matching the teeth.

It is evident from the above comments that an endless inventive conveyor comprises a conveyor system formed from a plurality of swiveling concatenated conveyor links, which is guided and driven at least through a drive sprocket and an idle sprocket. In a further development of the invention, it is also conceivable to insert a driving wheel and several reversing wheels into the deflection areas of the endless conveyor and especially in the transfer and unloading area of the endless conveyor at an inlet to a processing machine. It is furthermore entirely conceivable to associate with the driving wheel of the endless conveyor, in an area close to the unloading area of the endless conveyor, additional conveyors or also stationary guiding means for improving the delivery of the stalked material to the processing apparatus, which can also be supplied with driving energy by the driving wheel.

Movable cutting knives, such as rotating cutting knives, which act either in the free cut or in interaction with the cams of the cutting plane and are disposed below the endless conveyor, are particularly advantageous.

Furthermore, it is advantageous to provide a counter-blade in the region of the entrance. The cams of the cutting plane and other cams close above, pass over and under the cutting blade, so that plant residues, especially leaf residues, which stick to the cams, are comminuted by the stationary counter-blade and cannot wind around the cams.

Further advantages and details arise out of the examples of the object of the invention, which are described in the following, read in conjunction with the accompanying drawings.

DETAILED DESCRIPTION OF THE PREFERRED EMBODIMENTS

The harvester 1 can be used especially as front-end equipment 2 for a mobile working unit S of the chopper type for row crop or non-row crop harvesting of stalked plants 3, such as corn or the like. As a rule, corn fields are arranged as well as harvested in rows, which offers the advantages that automatic steering equipment can be used on the harvesters 1, and also a more uniform run is achieved than when it is driven transversely across the hilling created around the plants and the ditches between the rows. In the case of such harvesting in disregard of the rows, it happens that the front-end unit sinks partly into the ground or rises above it, so that a uniform cutting height is not always assured. This notwithstanding, the inventive harvester 1 is also very well suited for use independently of rows.

Figure 1:
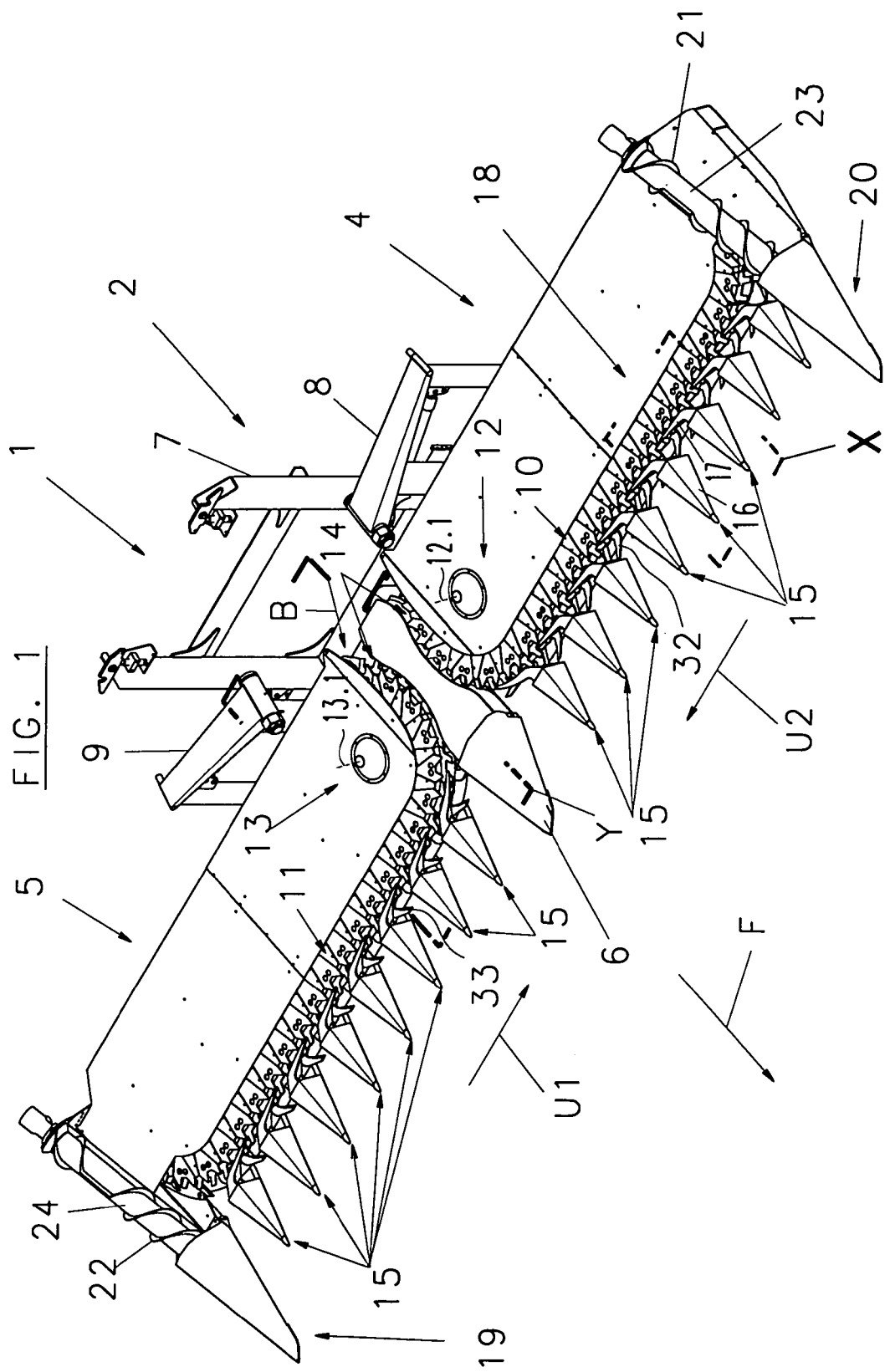
FIG. 1 is a perspective view of an inventive harvester with two gathering and transporting apparatuses, which are constructed in a mirror-image relationship to one another.

The harvester 1 of FIG. 1 consists of at least one and preferably, as shown here, of two gathering and transporting units 4 and 5 aligned in their full length across the working and running direction F and constructed in mirror-image relationship to one another, which are arranged side by side so that a wide swath can be harvested. Between the gathering and transporting units 4 and 5 is a central dividing point 6 for dividing the swath between the gathering and transporting units 4 and 5. To make the harvester 1 follow a working direction F, a supporting frame 7 is provided, which comprises supporting arms 8 and 9, which are articulated more or less about the transport and working direction F. By means of these supporting arms 8 and 9, the gathering and transporting systems 4 and 5 can be changed from the working and harvesting position represented in FIG. 2 to a transport position, wherein they assume an approximately vertically aligned (upfolded) position for a narrower width over the road with minimum interference with the forward view of the driver. For this purpose, the alignment of the pivot axes of the supporting arms 8 and 9 on supporting frame 7 is made, so that the pivot axes, looking in the transport and working direction F, run slightly apart and/or have a downwardly inclined alignment, so that, in the transporting position, the driver looks at the rear sides of the transport devices 4 and 5, at which the reverse strands extend and otherwise has a free field of view. Pursuant to the invention, each gathering and transport system 4 and 5 consists of a circulating endless conveyor 10 and 11, which can be carried and driven in an outer end area by drive sprockets 12 and 13 with axes of rotation 12.1 and 13.1 near an area for unloading and transfer by the endless conveyors 10 and 11 to the processing apparatus, such as a chopper, and by sprockets 12 and 13, which are similar in form to the drive sprockets 12 and 13. The direction of the rotation of the endless conveyors 10 and 11 is indicated by U1 and U2, runs approximately athwart the line of travel F and is directed toward the middle of the harvester 1. Additional conceivable embodiments of a harvester can also be configured so that the directions of rotation U1 and U2 of the endless conveyors 10 and 11 are at an angle rearward against the working and travel direction F and toward the center of the harvester.

Figure 8:
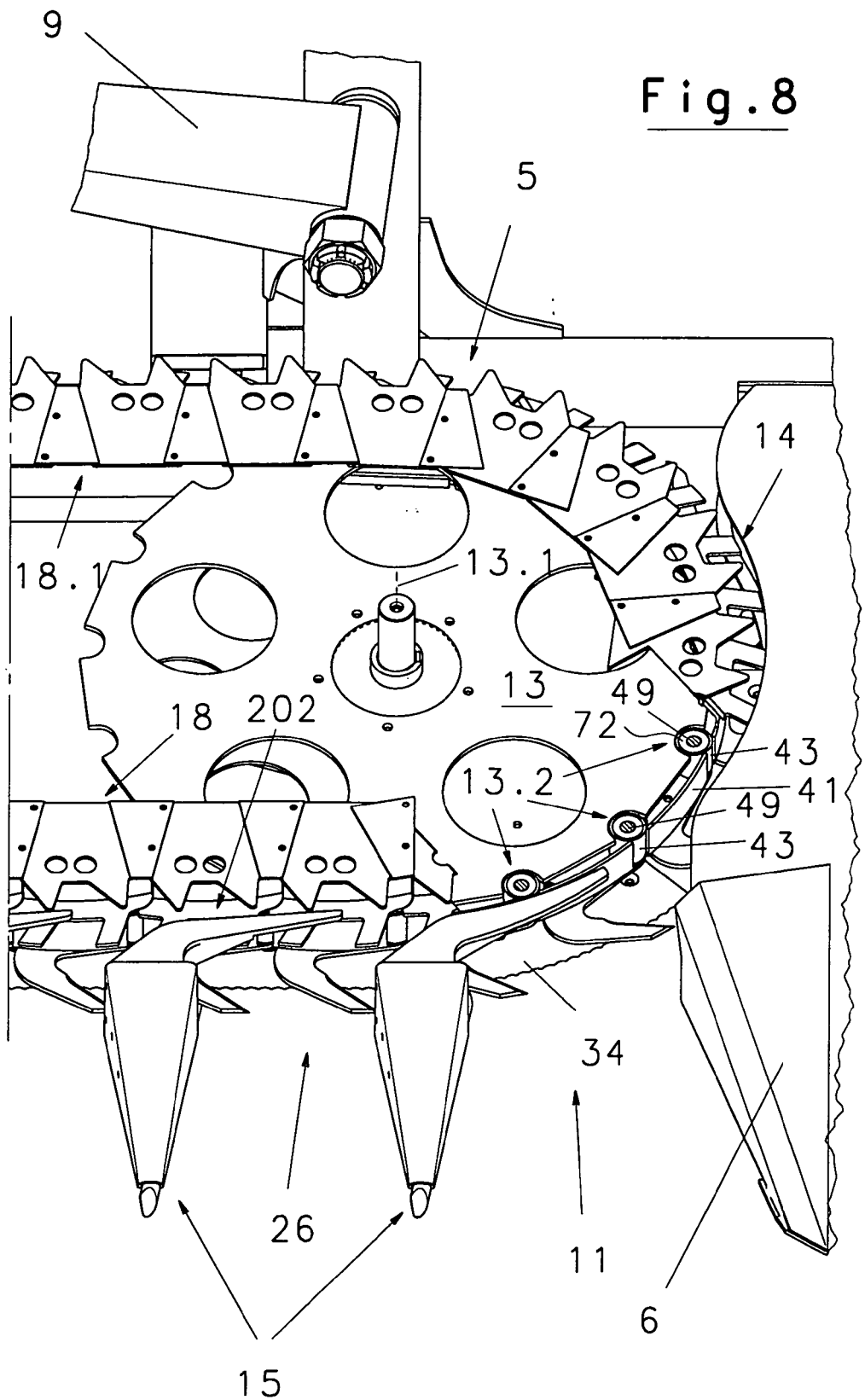
FIG. 8 is an enlarged, partially truncated perspective view of the drive of an endless conveyor as detail Y in FIG. 1.
Figure 9:
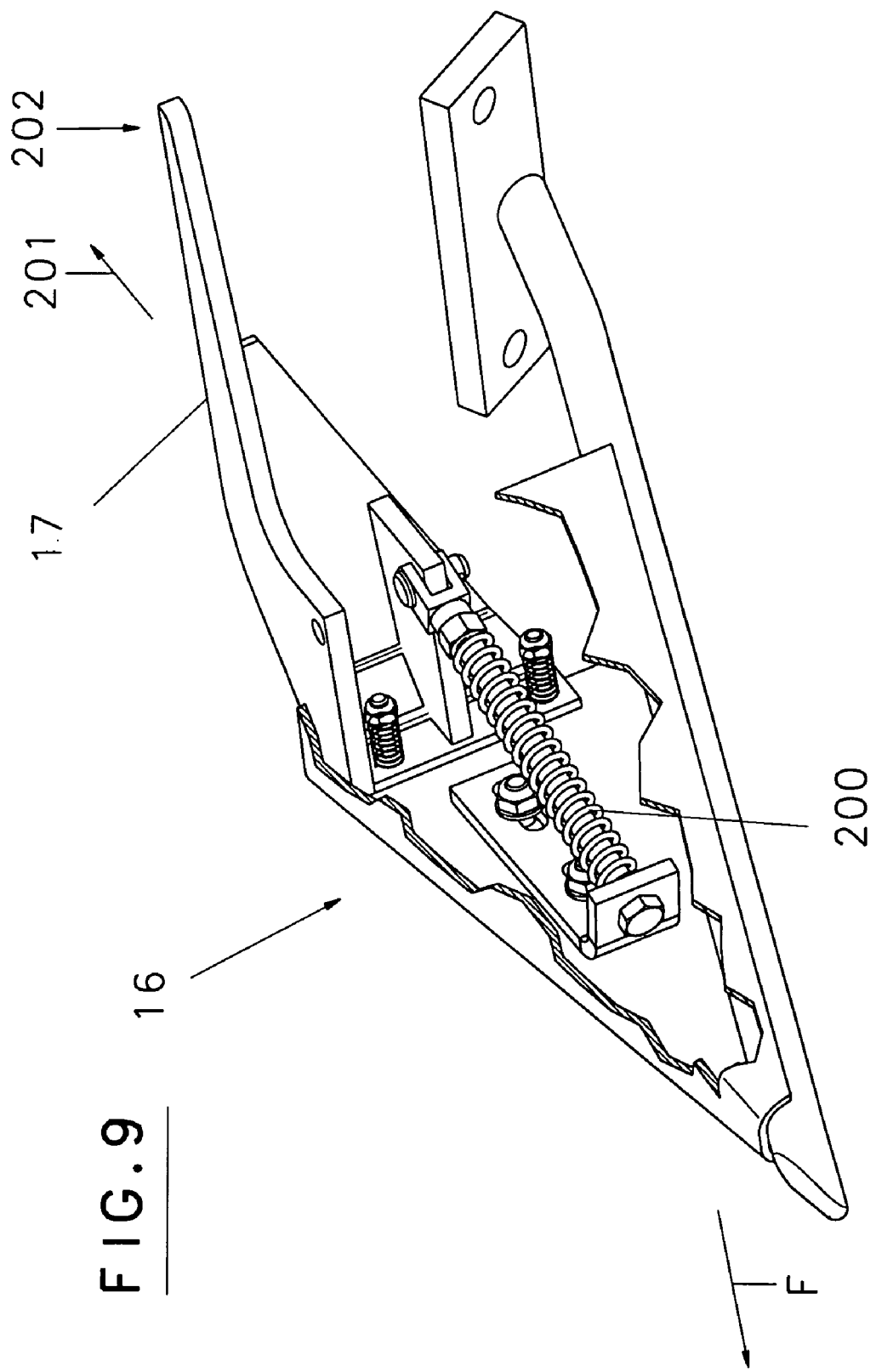
FIG. 9 is a detail of a plant lifter with a guiding ring disposed resiliently thereon.
Figure 10:
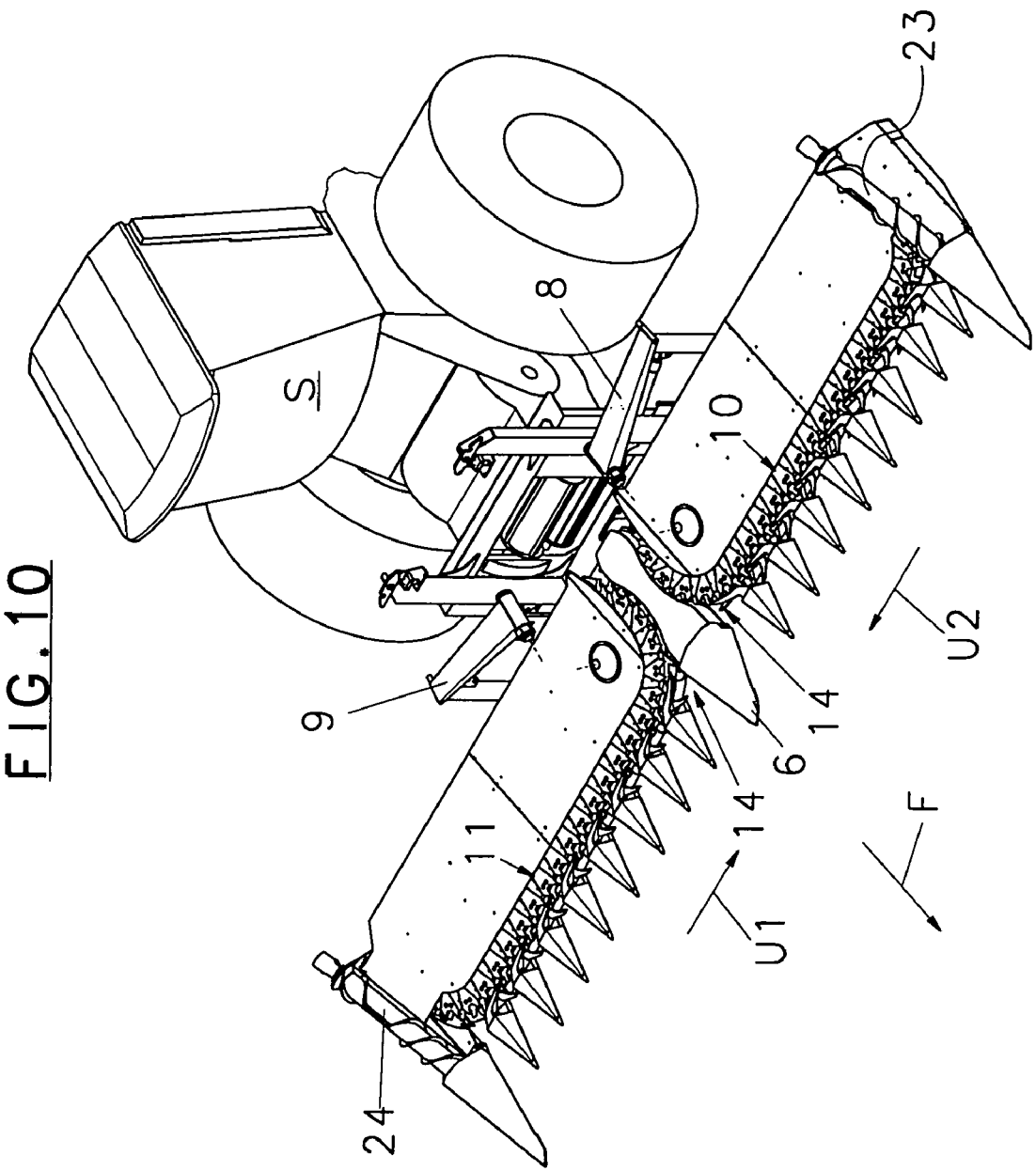
FIG. 10 is a representation similar to that of FIG. 1, with a self-propelled vehicle carrying the harvester and the further processing system.
Figure 11:
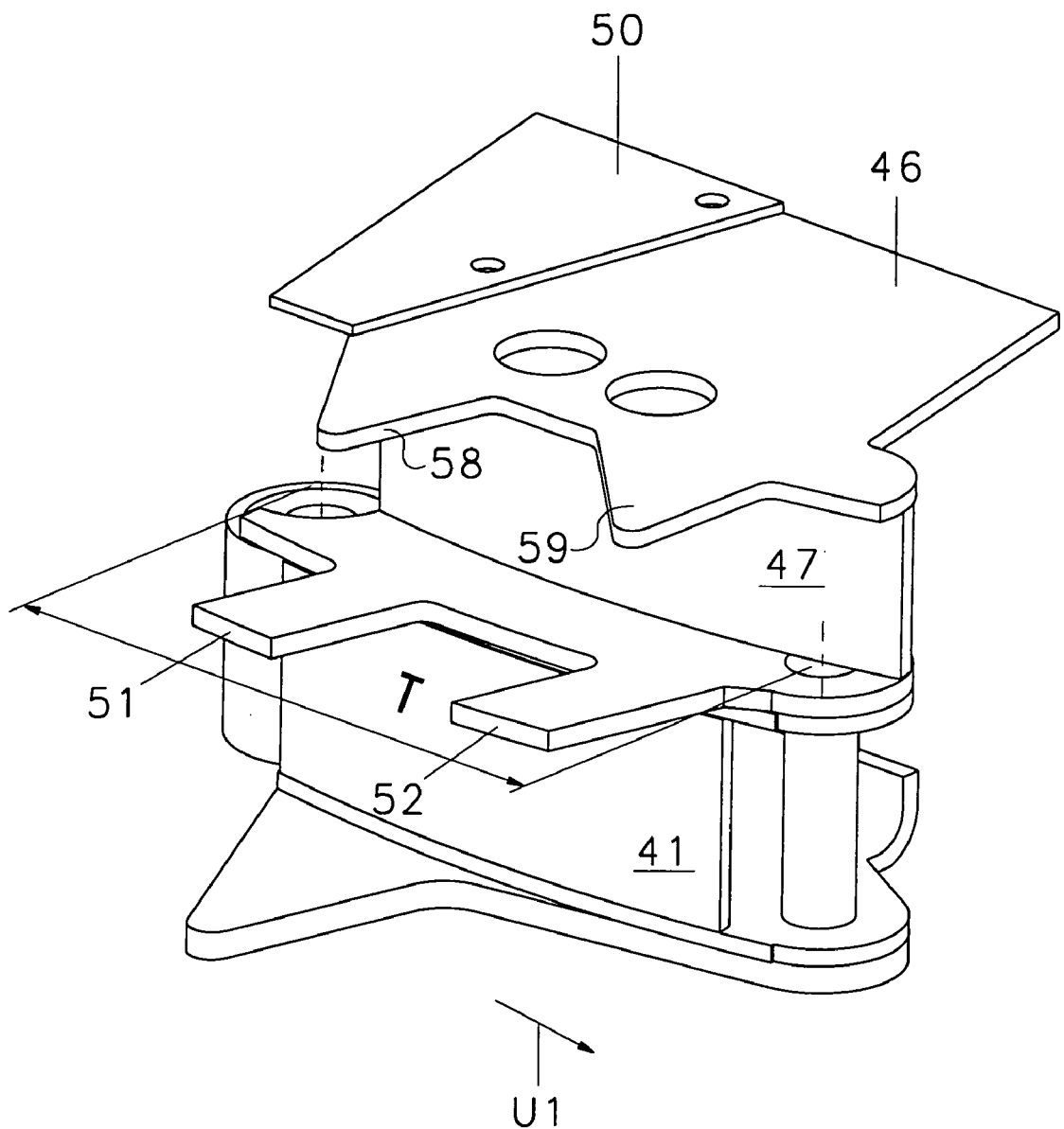
FIG. 11 is an alternative embodiment of a conveyor link with a guiding shape in the lower plane.
Figure 12:
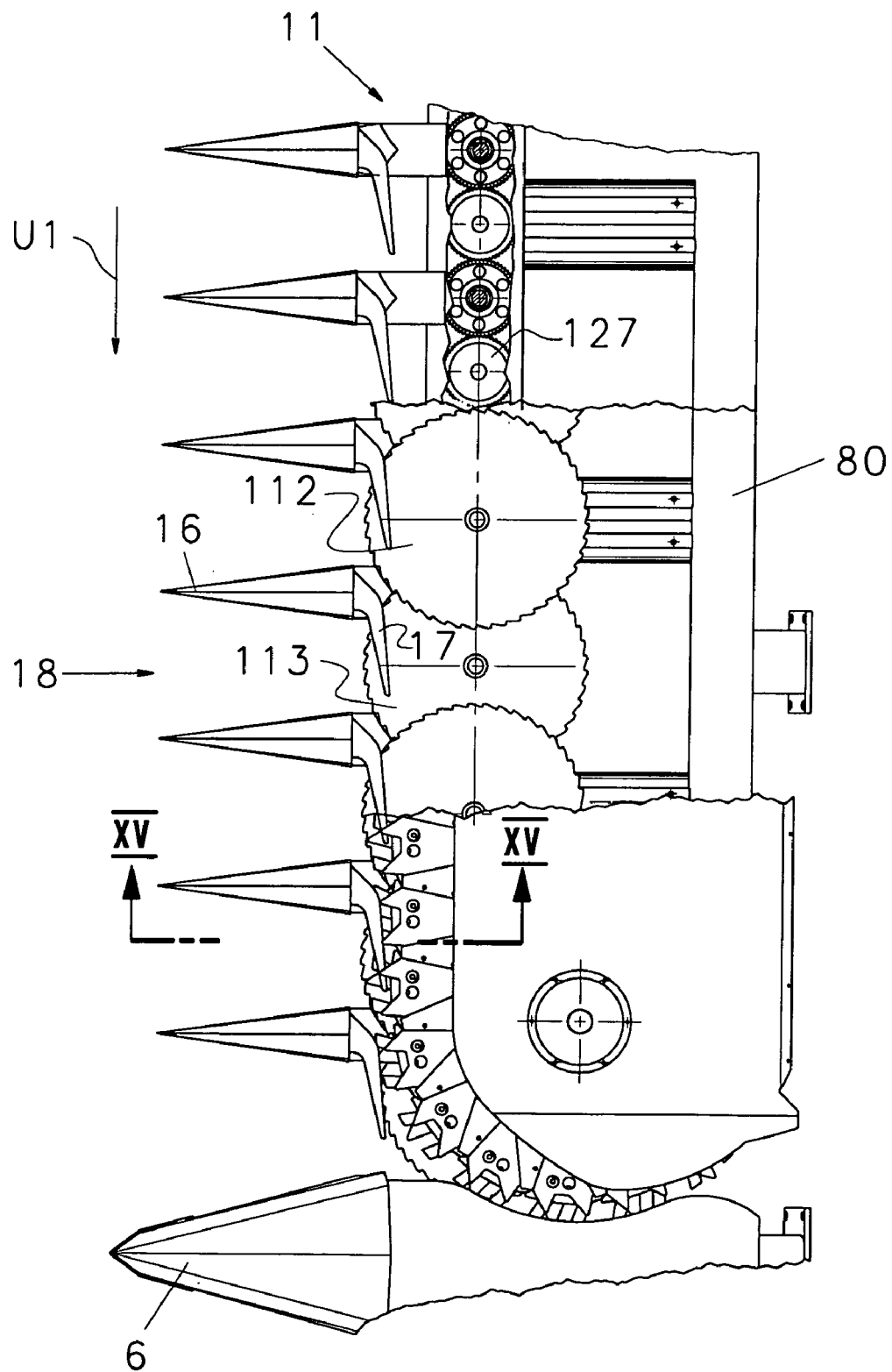
FIG. 12 is a partially cut away view from above of the alternative conveyor with conveyor links of FIG. 11.
Figure 13:
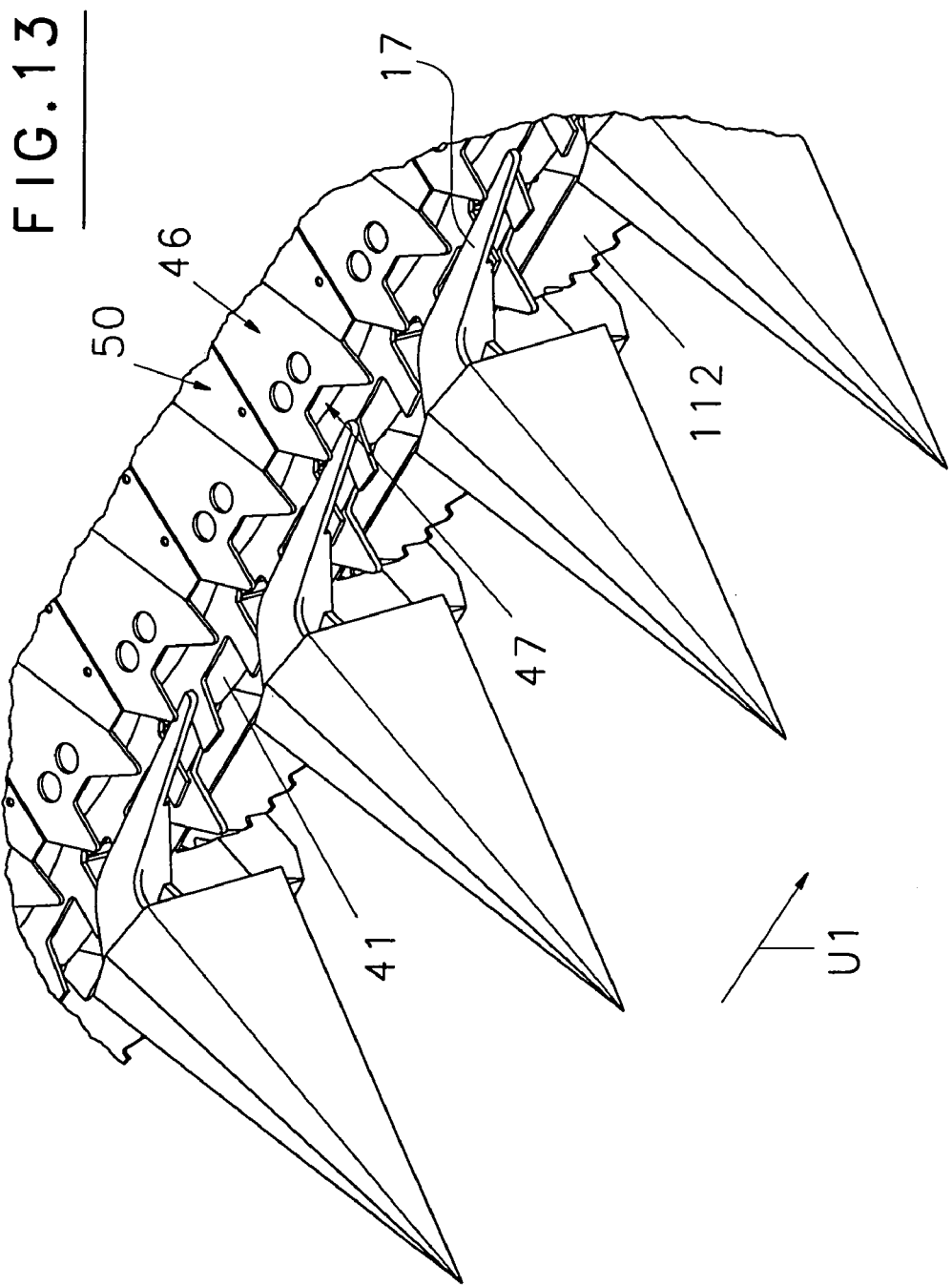
FIG. 13 is a perspective view of a portion of the working strand of the alternative conveyor, partially cut away.
Figure 14:
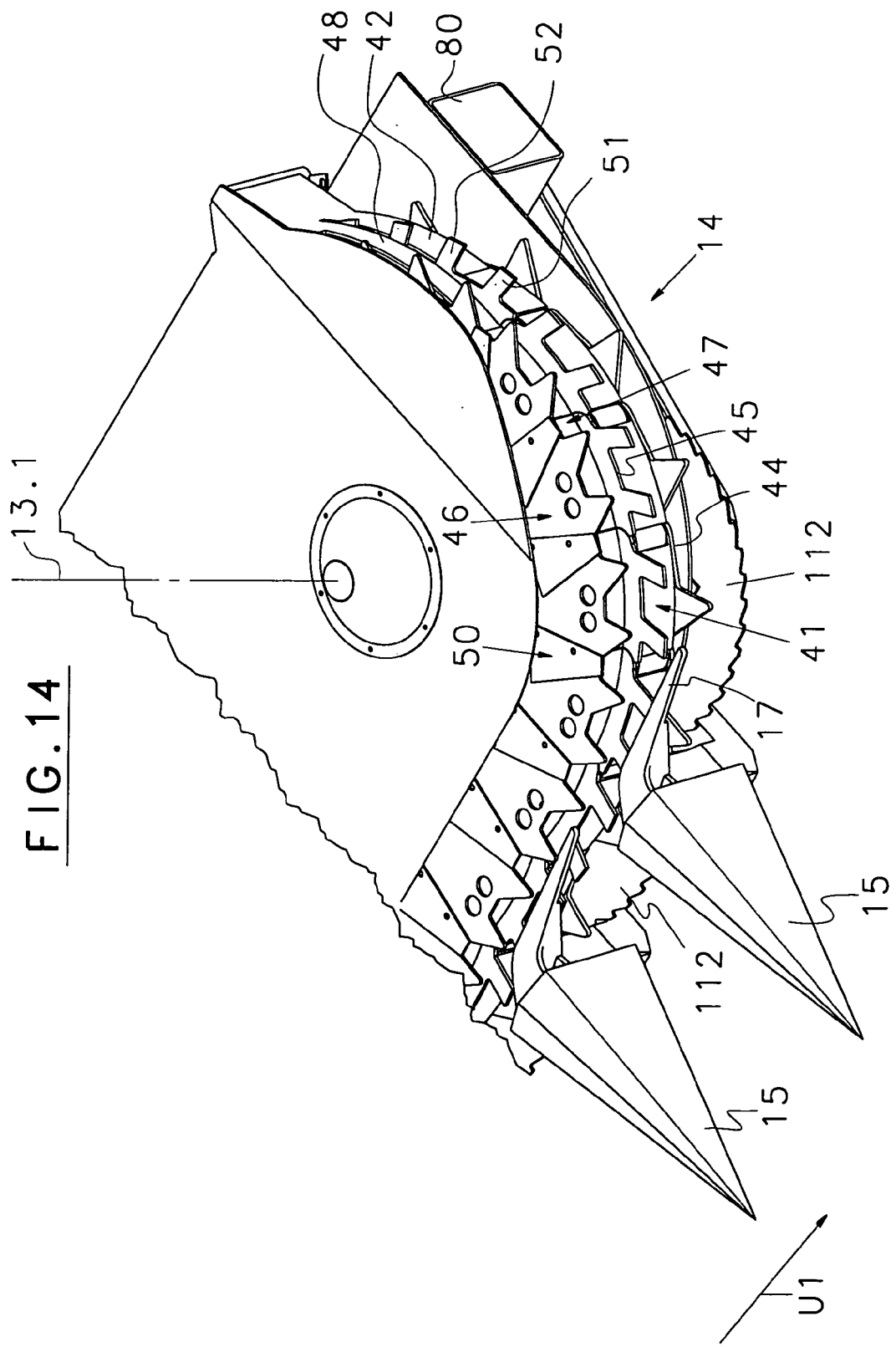
FIG. 14 is a perspective view of the deflection region at the edge of the entrance of the alternative conveyor.
Figure 15:
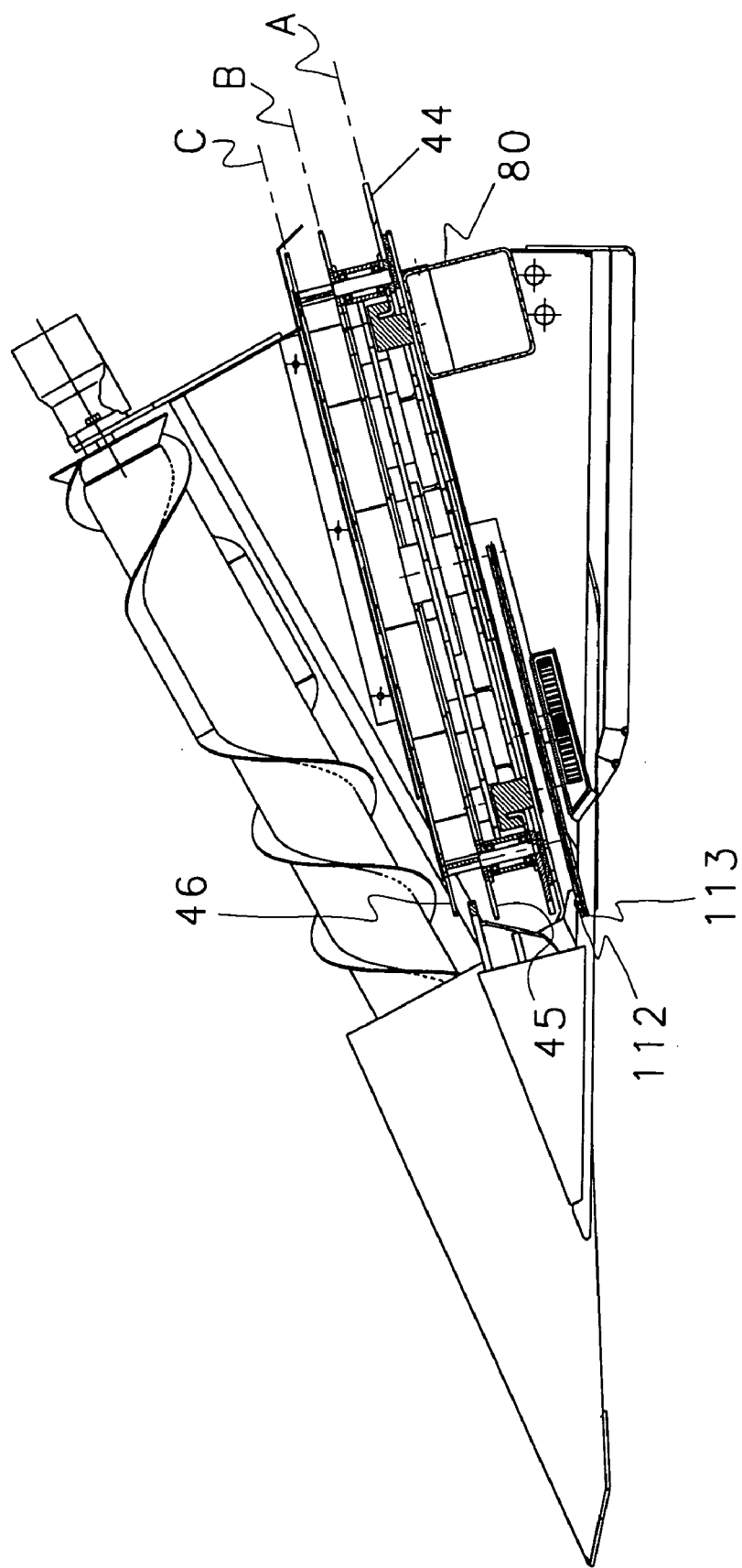
FIG. 15 is a section along line XV—XV in FIG. 12.

As it can furthermore be seen in FIG. 1, each gathering and transport device 4, 5 has, on the one hand, leaf and plant lifters 15 to facilitate the gathering of lying or partially lying stalked plants and, on the other, to support the endless conveyor 10, 11 in feeding the stalked plants to the processing apparatus, and they consist substantially of parting points of pyramidal shape and a guiding hook 17. The guiding hooks 17 are of such a shape that they extend first approximately parallel to a working strand 18 of the endless conveyor 10, 11, and reach to the distance that is necessary to allow the stalked plants 3 to pass to the next leaf and plant lifter 15 in the direction of rotation U1, U2. The guiding hook 17 is spring mounted, being put under tension by the force of a spring 200 in the direction of the arrow 201, as shown in FIG. 9. This pretension acts substantially counter to the line of travel F and is directed against the working strand 18 of the endless conveyor 10 or 11. Thus, a channel 202 is formed between the guiding hook 17 and the working strand 18 for the transport of the severed plants 3 the plants 3 being held securely in this channel 202. The channel extends in the embodiment of FIG. 1 across the line of travel F. Since the guiding hooks 17 are displaceable against the spring force, even very thick stalks 3 or clusters thereof are carried simultaneously through the channel 202 (FIG. 8) in the directions U1 and U2. The force of the springs 200 is adjustable.

Furthermore, at least one stalk and plant divider 19, 20 is provided as a dividing means between the cut and uncut plant stalks in each gathering and transport device 4, 5. The severing of the stalked plants can be supported by, for example, driven rolling elements 23, 24 equipped with a spiral 21, 22 associated with the stalk and plant dividers 19 and 20.

Figure 2:
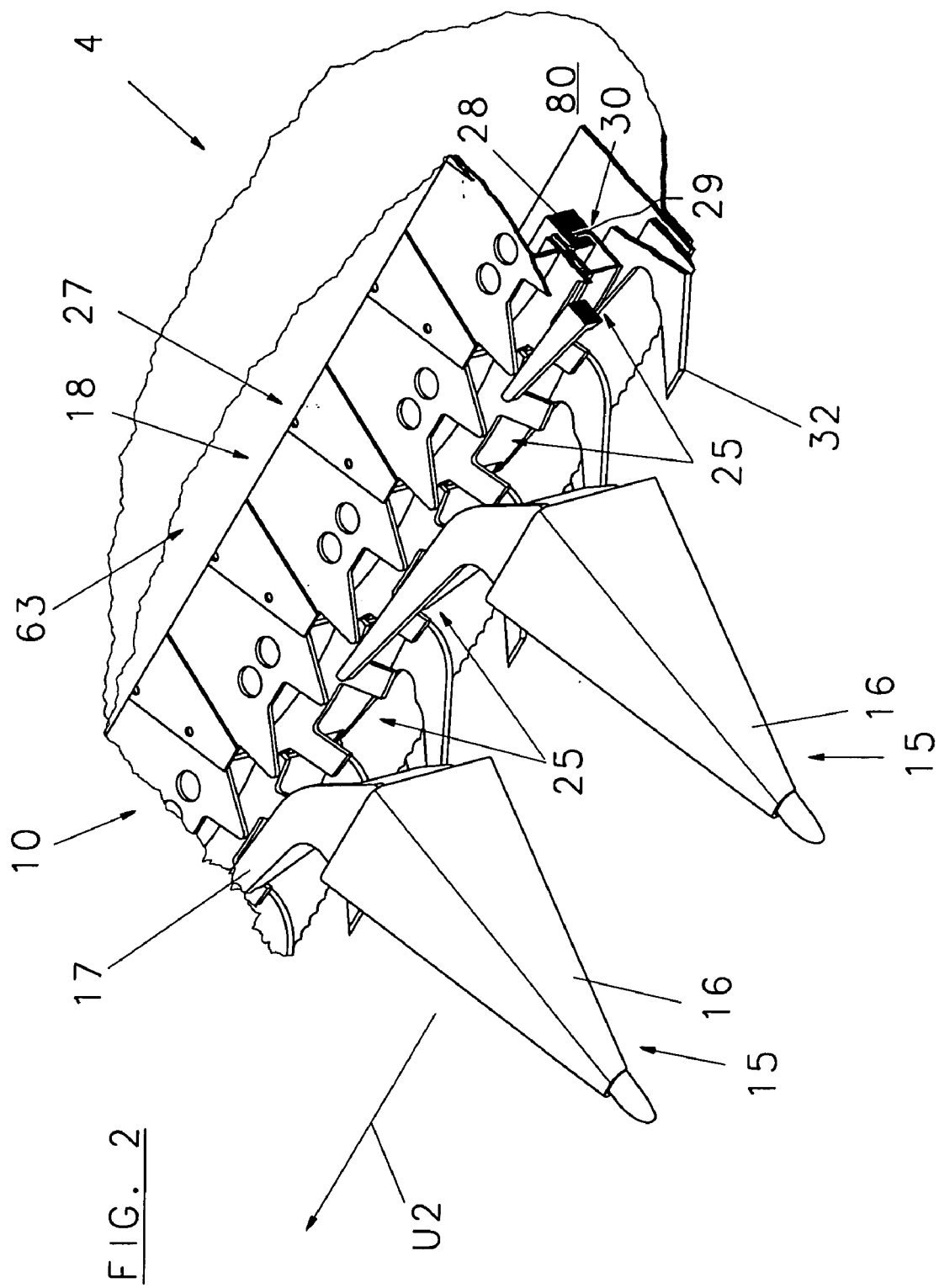
FIG. 2 is an enlarged, partially truncated view of detail X in FIG. 1.
Figure 3:
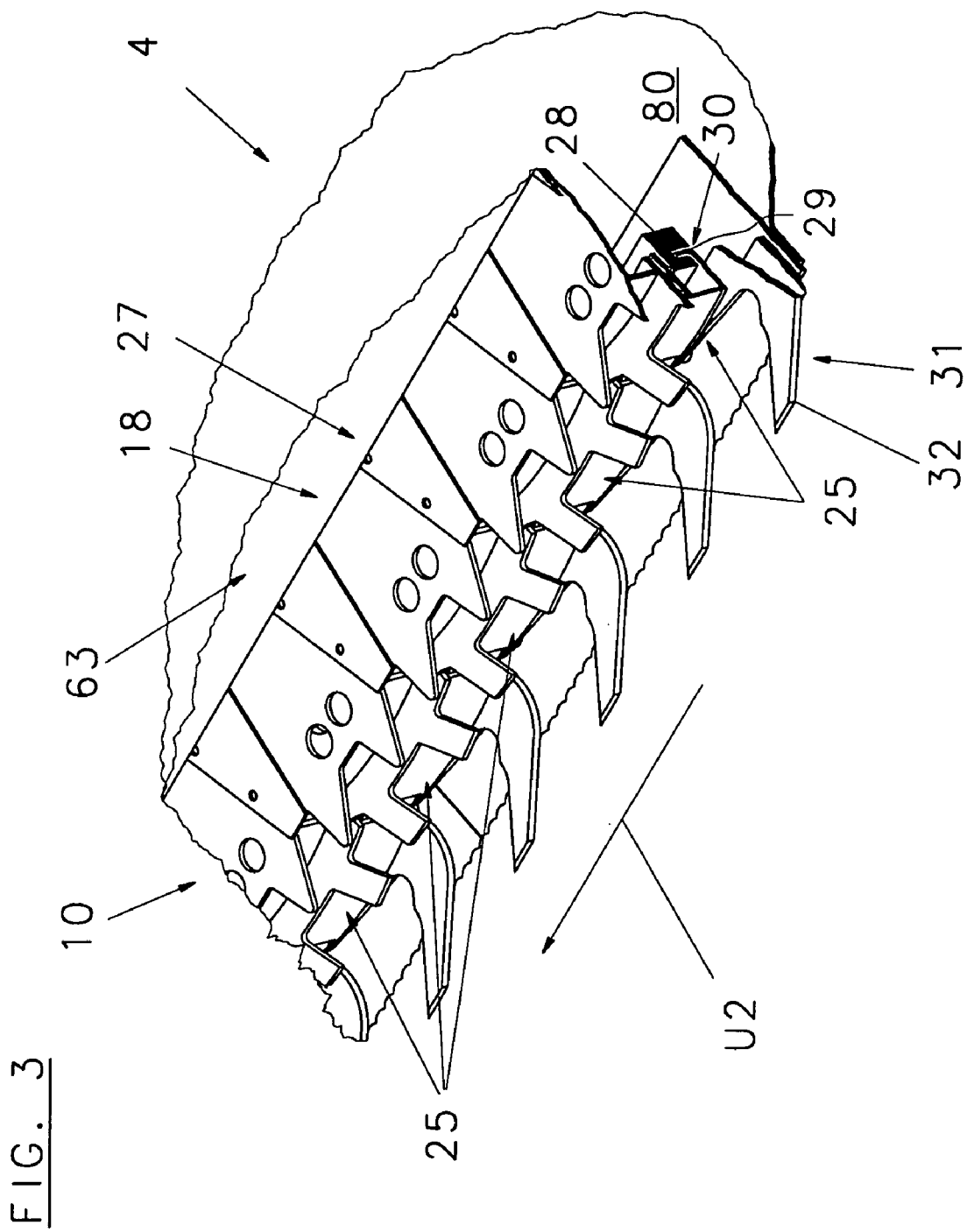
FIG. 3 is a view similar to that of FIG. 2, but without leaf and plant lifters.
Figure 17:
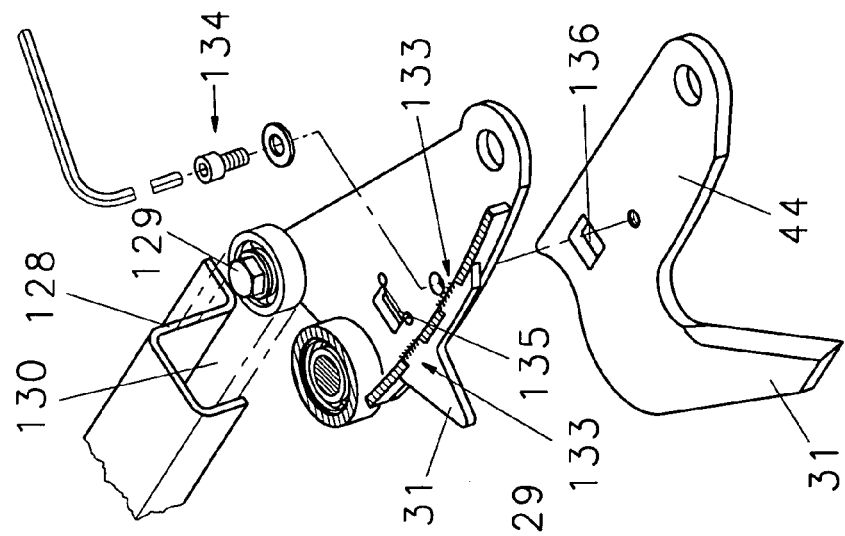
FIG. 17 is an exploded representation of the lower part of the conveyor link of FIG. 16, approximately corresponding to a section XVII—XVII in FIG. 16.
Figure 16:
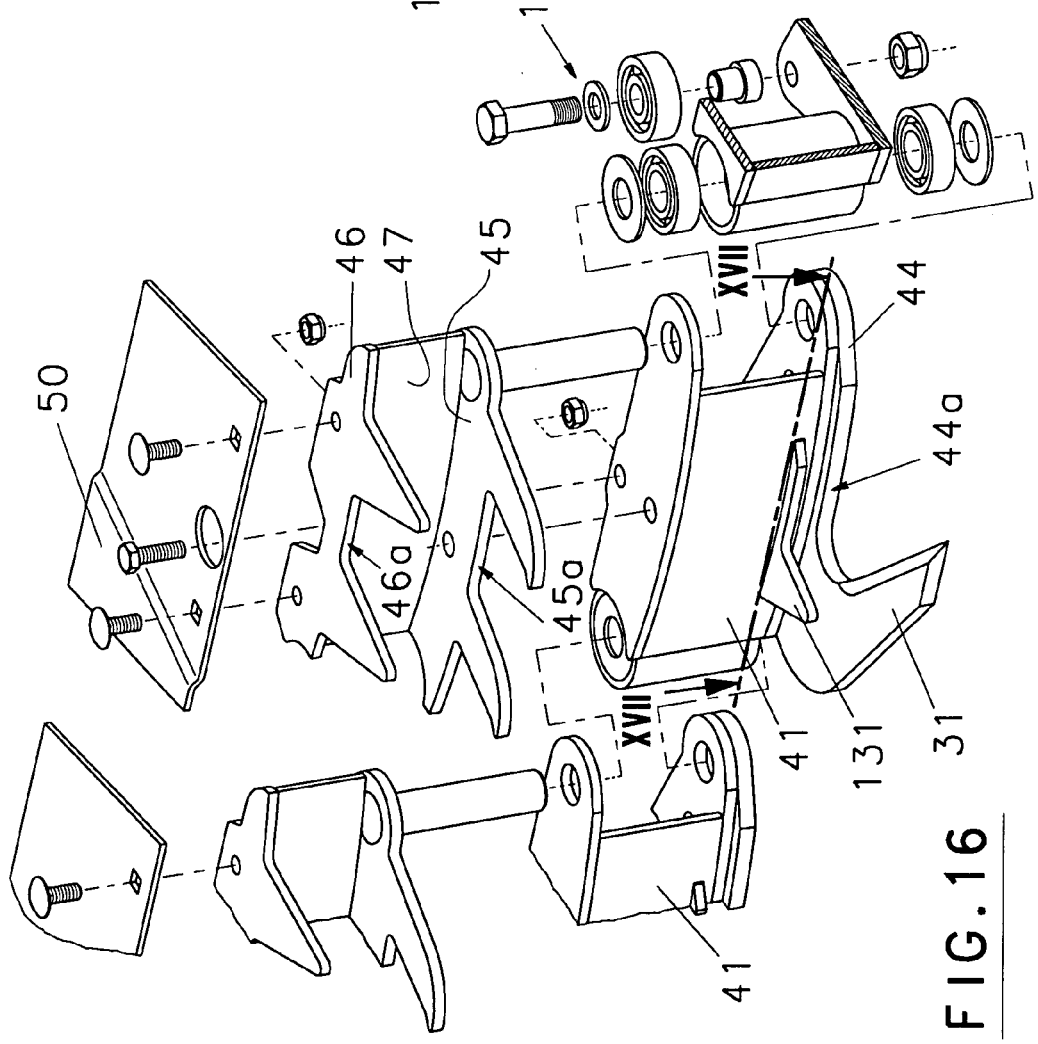
FIG. 16 is a representation similar to that of FIG. 5 of an alternative conveyor link.

In FIGS. 2 and 3, portions of the gathering and transport device 4, 5 are represented in an enlarged perspective view but, in FIG. 3, no leaf and plant lifters 15 are provided. As it appears especially from these Figures, an inventive endless conveyor 10, 11 consists of a plurality of conveyor links 25, 26 and thus constitutes a flexible conveyor system 27, which can be carried along different paths. In the embodiment represented, the conveyor links 25, 26 of the flexible conveyor system 27 are guided in the working strand 18 along a rectilinear path of movement established by a guiding plate 28, a retaining edge 29 of each conveyor link 25, 26 engaging in a slot 30 in the guiding plate 28. As shown in FIGS. 16 and 17, a sliding or rolling bearing on a post 129 can be provided, which can be guided in a groove 130 in the guiding plate 128. In this case, the friction is reduced by the bearing. For example, instead of the friction guidance, a rolling friction of the conveyor links 25, 26 is made possible to hold them and guide them on the back in direction U1 or U2, which reduces the friction.

It can furthermore be seen in FIG. 17 that the cutting means 31, which is to be easily replaceable when worn, is held by only a single central screw 134. A further securing is provided by a downwardly bent tab 135, which engages an opening 136 in the flat portion 44 bearing the cutting means 31.

The rectilinear working strand 18 leads into an arcuate return end (FIG. 1) near the transfer area 14 of the endless conveyor 10, 11 and into a likewise rectilinear idle strand 18.1 and the other arcuate outside return end. In an alternative embodiment of the invention, however, either the working strand 18 can have a path of movement, which curves toward or away from the line of travel F, or, especially in the vicinity of the inside reversal end, it can pass around a plurality of driving and/or idle sprockets. The endless conveyor 10, 11 then runs in the end sprocket area at least over a short length counter to the line of travel.

Figure 4:
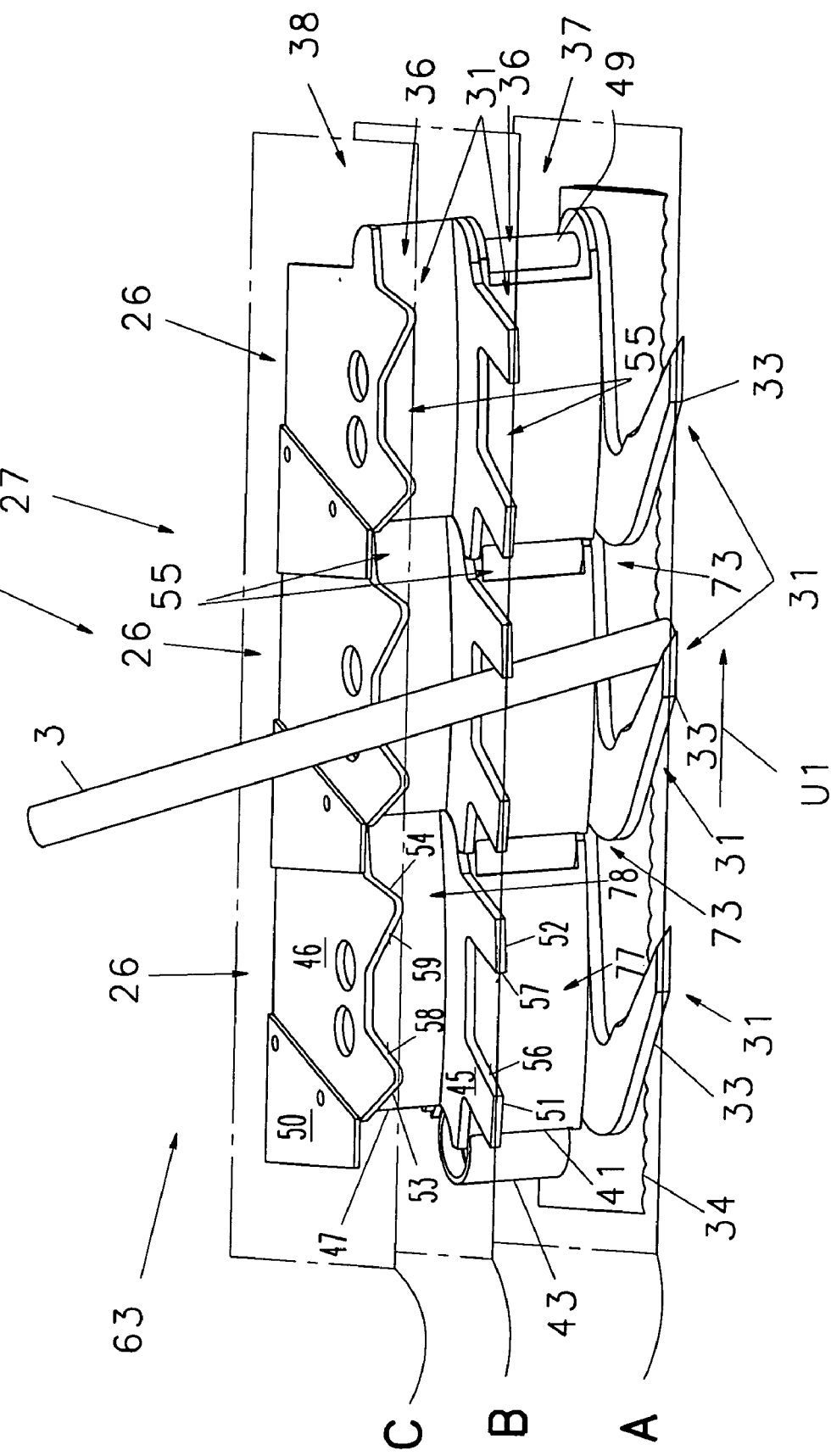
FIG. 4 is a truncated, perspective view of an inventive endless conveyor, with a diagrammatically shown plant stalk as seen in a direction opposite to the traveling direction.
Figure 5:
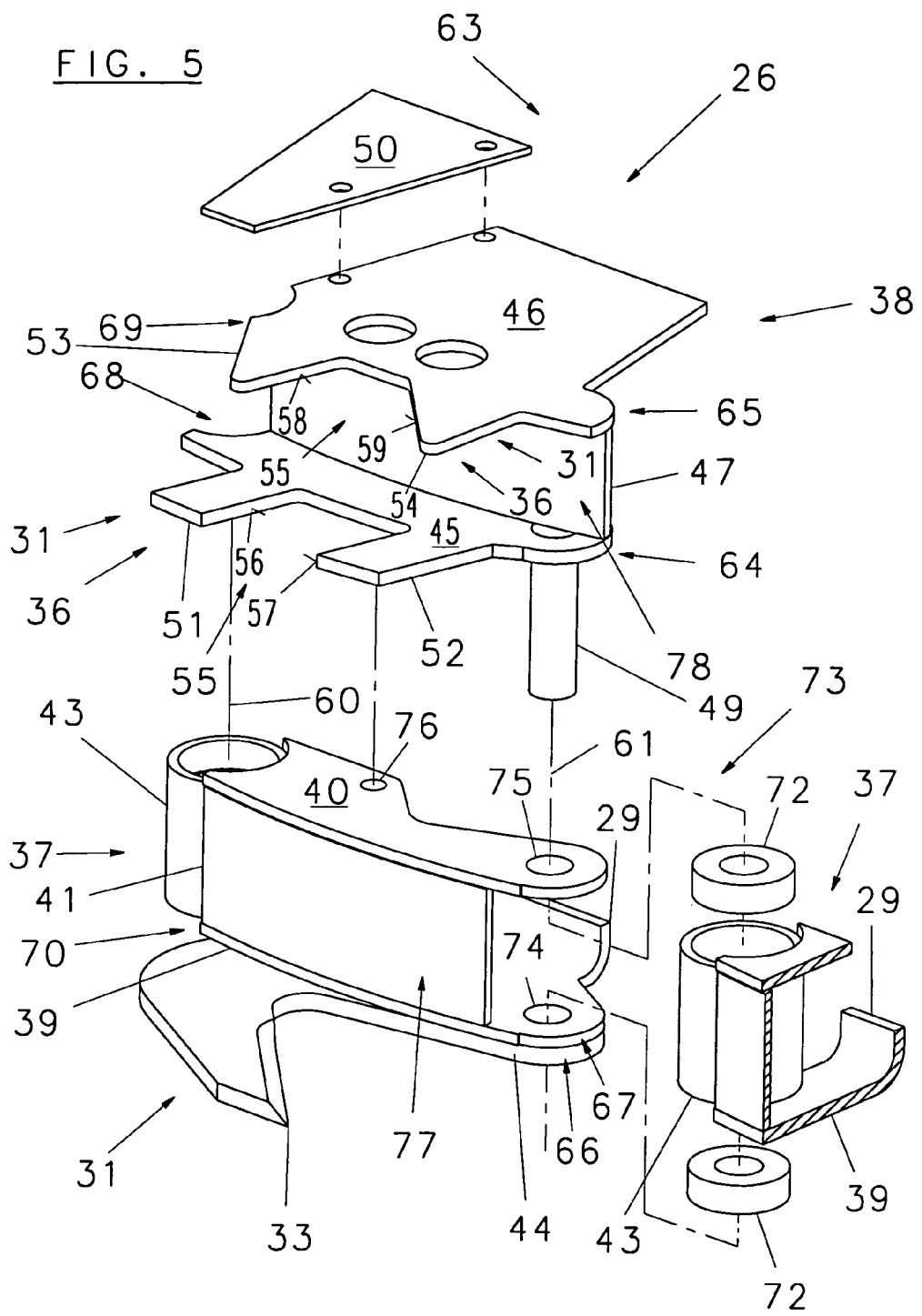
FIG. 5 is a perspective view of a transporting and guiding element in a representation exploded in sections.
Figure 6:
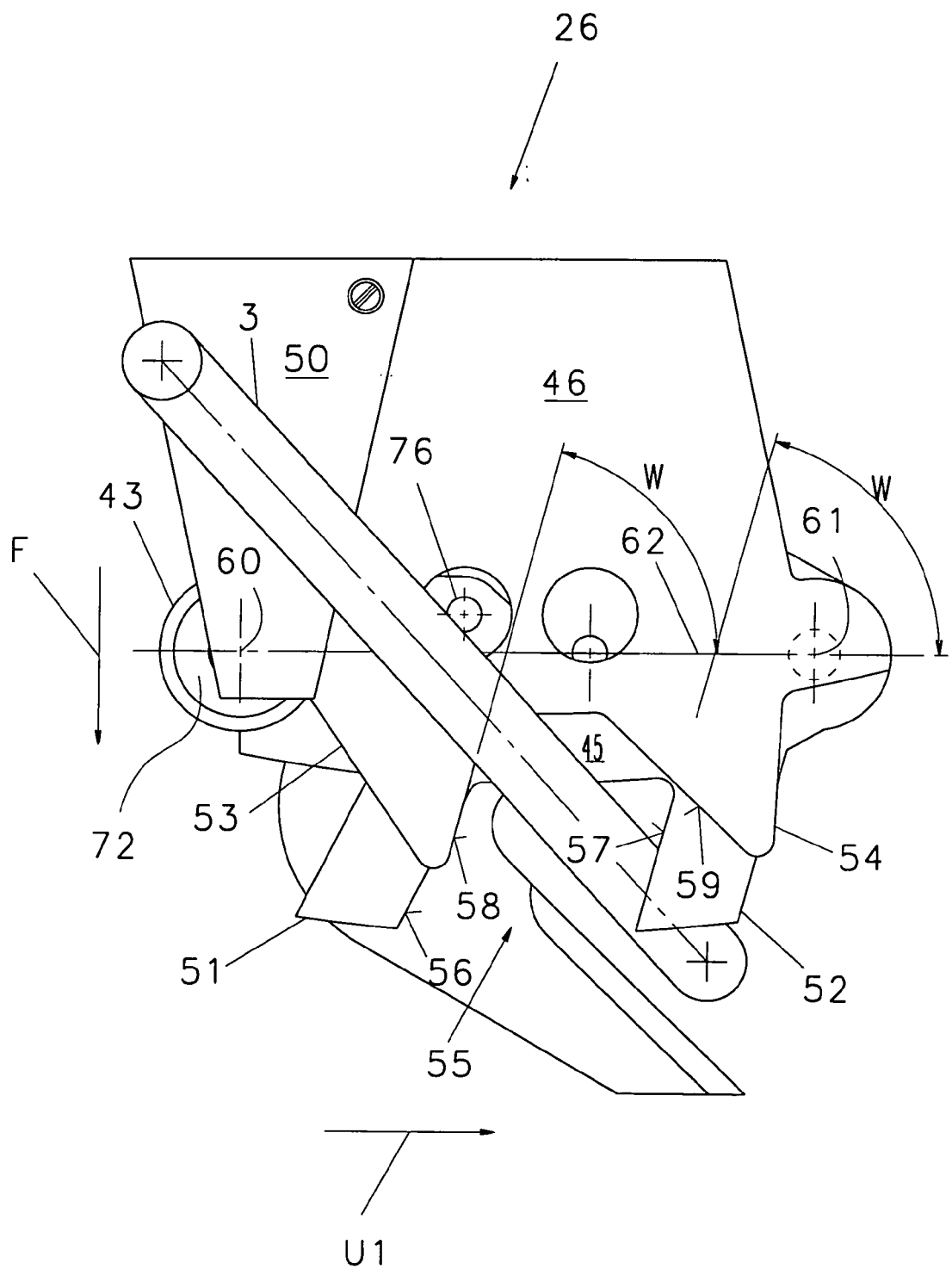
FIG. 6 is a view from above of the transporting and guiding element shown in FIG. 5, during the transport of a plant stem.

The basic construction of a first version of a conveying and guiding element 25, 26 as well as an endless conveyor 10, 11, comprised thereof pursuant to the invention, is to be seen in FIGS. 4 to 6. As can be seen, especially in FIG. 4, the conveying and guiding elements 25, 26 of the endless conveyor 10, 11 are divided into three conveying and guiding planes A, B and C spaced vertically one over the other. Carriers 31 are provided in these conveying and guiding planes, which either serve as counter-knives 32, 33 and thus form a mowing and cutting system 35 in cooperation with a stationary knife 34 (FIG. 7) situated underneath the conveying and guiding elements 25, 26, or serve as a holder 36 for guiding the stalked plants 3 as they are transferred to a processing apparatus in the nature of a cutting unit of a chopper. In the conveying and guiding plane A, the carriers 31, which are configured as counter-knives 32, 33, are disposed, while the carriers 31, which are provided as holders 36, are mounted in the conveying and guiding planes B, C. In the scope of the invention, however, a division of the conveying and guiding elements 25, 26 into two or more than three conveying and guiding planes can be contemplated.

Figure 7:
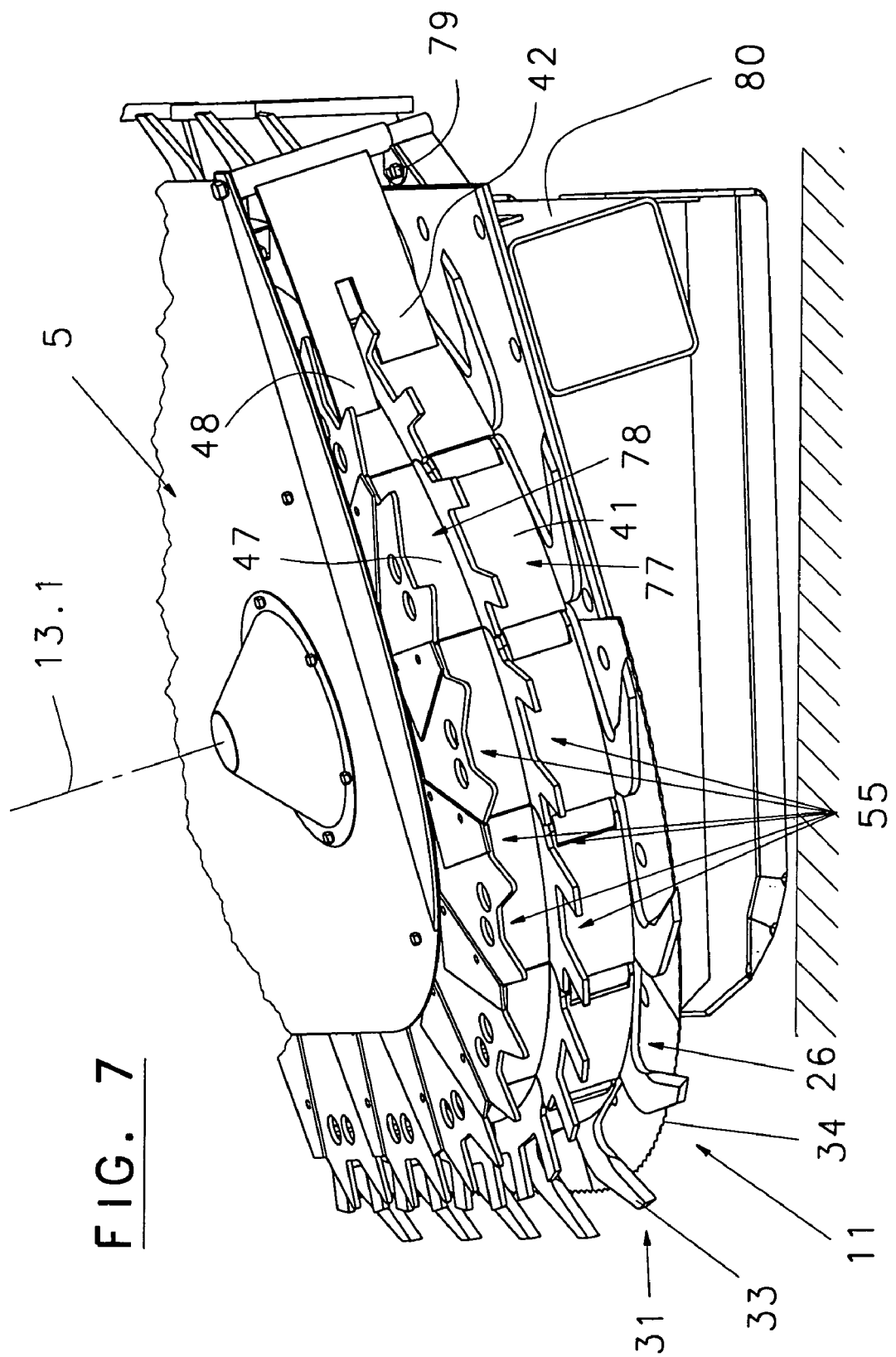
FIG. 7 is a truncated perspective representation of the inventive harvester, as seen in the direction of arrow B in FIG. 1.

In FIG. 5, an advantageous embodiment of a conveying and guiding link 25, 26 is shown. For reasons of easy installation in the assembly of an endless conveyor, provision is made for dividing the conveying and guiding elements 25, 26 into a lower section 37 and an upper section 38. The sections 37, 38 of the conveying and guiding link 25, 26 are preferably configured so that the junction, at which sections 37, 38 can be fastened together, is in the conveying and guiding plane B. The result is that the lower section 37 consists substantially of a holding body 39 to accommodate the carrier 31 configured as a counter-knife 32, 33, an upper connecting plate 40 and a guiding body 41 for a stripper 42 (FIG. 7) welded like a bridge between the holding body 39 and the upper connecting plate 40. On the side of the conveying and guiding link 25, 26 following with respect to the direction of the rotation U1, U2 of the endless conveyor 10, 11, a bearing housing 43 is provided, which is likewise fastened by welding to the other parts of the lower section 37. The bearing housing 43 simultaneously forms a means of attachment for the driving of the endless conveyor 10, 11 by a drive sprocket 12, 14. The sprocket 12, 13 (FIG. 8) again has the recesses 13.2 corresponding to the means of attachment or bearing housings 43. The endless conveyor 10, 11 thus in its entirety forms a compact, enclosed unit. To mount the carrier 31 serving as counter-knife, pins (not shown) are provided, for example, on the underside of the holding body 39 and engage in a pattern of holes in a flat portion of the counter-knives 32, 33, so that the counter-knives 32, 33 can then be locked in place by driving flat-head screws from the bottom into the counter-knives 32, 33. The counter-knives 32, 33 themselves are hook-shaped and, on the portion projecting from the bottom section of the conveying and guiding elements 25, 26, a beveled cutting edge is created. The upper section 38 consists substantially of a flat body 45 lying in the conveying and guiding plane B holding the stalks and a flat body 46 in the holding plane C, an additional, upright deflection shield 47 being affixed by welding to the flat bodies 45, 46 to form a continuous front face and to cooperate with the stripper 48 (FIG. 7). In the flat body 45 of the conveying and guiding plane B, a downwardly pointing bolt 49 is inserted on the side leading in the direction U1, U2 of the rotation of the endless conveyor 10, 11 and is affixed to the flat body 45. Above the flat body 46 of the conveying and guiding plane C serving as a holding plane for the stalks 3, there is a cover plate 50, which can be bolted to the flat body 46 to cover the free space between the flat bodies 46 of two adjacent conveying and guiding elements 25, 26, which is necessary for the passage of the endless conveyor 10, 11 through an end sprocket area. The cover plate 50 (FIG. 16) can be cranked so that conveying and guiding links 25, 26 adjacent one another in the sprocket area can pass one over the other and, in general, assure good protection also of the upper side of conveyor 10, 11 against dirt.

The form and the spatial arrangement of projections 51, 52 on the flat bodies 45 in the conveying and guiding plane C and of the projections 53, 54 on the flat bodies 46 in the conveying and guiding plane C are of special importance to the trouble-free gathering and carrying of the stalked plants 3 in the conveying and guiding elements 25, 26 of the endless conveyor 10, 11. In the embodiment represented in FIGS. 5 and 6, there is a space 55 between the projections 51, 52 and 53, 54 for receiving the stalked plants 3 (see FIGS. 4 and 6), this space 55 being defined by the confronting edges 56, 57, 58 and 59 of the projections 51, 52 and 53, 54. As it can be seen in FIGS. 4 and 6, the need for a reliable holding of the stalked plant 3 in the gap 55 is affected mainly by the shape and the arrangement of the edges 57, 58 of the conveying and guiding link 25, 26. Therefore the edges 57, 58 defining the space 55 and aligned approximately parallel to one another have an alignment in which, as represented in FIG. 6, they enclose an angle W with a plane 62 passing through terminal axes of rotation 60, 61 of the conveying and guiding link 25, 26, which is preferably in an angular range, which is equal to or less than 90°. Thus, the edge 57 of projection 52 is an obstacle to any accidental dropping of the stalked plant 3 out of the gap 55 in a conveying and guiding link 25, 26. For the projections 51, 52 of the flat body 45 in the conveying and guiding plane B, their desirable pattern is a rectangle (parallelogram) slanting against the direction of rotation U1, U2, in the conveying and guiding plane A, B, C, while in the case of the projections 53, 54 of the flat body 46 in the conveying and guiding plane C, an approximately triangular shape is preferred.

In a further embodiment of the invention, there is the possibility of providing only one projection 52 in the conveying and guiding plane B in the flat body 45 and of providing only one projection 53 in the flat body 46 in the conveying and guiding plane C, so that a gap 55 thereby defined by the edges 57 and 58 is formed for receiving the stalked plant 3, the edges 57, 58 being aligned at least approximately parallel to one another. To improve the holding action on the stalked plant 3 in a gap 55 in the conveying and guiding elements 25, 26, in the embodiment, the flat body 46 of the conveying and guiding plane B is set back into an inner area 63 of the endless conveyor 10, 11. Thus, the stalked plants 3 can also assume a position inclined slightly rearwardly against the travel and working direction F, so that the position of the center of gravity changes and therefore the cornstalk is clutched more tightly in the gap 55. Likewise, more free space is obtained, which makes it possible for still another cornstalk to be taken into the gap 55. As it can be seen in FIGS. 5 and 6, the plate bodies 45, 46 of the conveying and guiding planes B and C and the holding body and the flat portion 44 of the counter-knives 32, 33 have arcuate sections 64, 65, 66 and 68 at the leading ends of the endless conveyor 10, 11, with respect to its directions of rotation U1, U2, while at the trailing end, with respect to its directions of rotation U1, U2, recesses are created. In the assembled state, these arcuate sections 64, 65, 66, 67 and the arcuate recesses mate with one another with slight free play and bring about, on the one hand, that bearing elements 72 contained in the bearing housing 43 are protected by an effective shielding against dirt and, on the other hand, prevent trouble from occurring during the harvesting operation by plant residues catching on projecting edges of the conveying and guiding elements 25, 26. Since, in the area of the conveying and guiding plane B, there is a separation point, there are also, of course, the necessary connecting plates 40 needed in order to produce a connection between the lower section 37 and the upper section 38, with corresponding arcuate segments and arcuate recesses.

The swiveling connection 73 (FIG. 5) is created by the fact that a lower section 37, in the bearing housing 43 of which bearing elements 72, configured as sealed, maintenance-free roller or grooved ball bearings, are inserted, can be introduced into a pocket-like free space in the lower section 37 of a trailing conveying and guiding link 25, 26, so that then, when the sections 37 and 38 are assembled, the bearing bolt 49 of the upper section 38 passes through bores 74, 75 and thus, simultaneously, the bearing elements 72 of the lower section of the leading conveying and guiding link 25, 26. A bolt not shown can serve to lock the sections 37, 38, being mounted in a bore 76 of the connecting plate 40 and a bore, also not shown, in the plate body 45.

The above description of the transport elements 25, 26, as well as the placement of the reference numbers refers to an embodiment, which is represented in FIG. 5 and can be used, with reference to the travel and working direction F, on the right side of the harvesting machine 1. For a harvesting machine for use on the left side of a machine, parts of mirror-image shape are used, bearing the same reference numbers.

As seen especially in FIG. 7, guiding bodies 41, 47 are placed between the conveying and guiding planes A-B and B-C of each conveying and guiding element 25, 26 and cooperate with a stripper 42, 48. Pursuant to the invention, the guiding bodies 41, 47 have such a shape 77, 76, directed at the strippers 42, 48, that a virtually movement-free (recoil- and shock-free) stripping of the stalked plants 3 from the endless conveyor 10, 11 can be achieved in the area 14 of the transfer from the endless conveyor 10, 11 to a processing apparatus S in the nature of a cutting unit of a chopper. To this end, the shape 77, 78 facing the strippers bulges outward, for example, and the curvature of the contour 77, 78, as seen from one of the conveying and guiding planes A, B and C, follows the curvature of the path of the movement of the endless conveyor 10, 11 in the transfer area 14, so that consequently the curvature of the contour 77, 78 is made circular. As furthermore depicted in FIG. 7, the strippers 42, 48 are combined in a single component and are made adjustable by means of a screw 79 in relation to a frame assembly 80 of the gathering and transport apparatus 4, 5.

The strippers 42, 48 in the delivery area 14 of the endless conveyors 10, 11, are arranged on both sides of and in symmetry with a vertical longitudinal central plane of the vehicle and thus form lateral guides for the cornstalk 3, by which the latter is steered into the inlet opening of the chopper. The strippers 42 and 48 sweep substantially completely over space between the bottom cutting plane A, the first holding plane B above it, and the uppermost second holding plane C. In their rear portion, the strippers 42, 48 are combined in a flat body standing on edge, so that there is no gap between them. Only in the front area, in which the strippers 42, 48 attack the front face 77, 78 of the endless conveyors 10, 11, is there a horizontal division of the strippers 42, 48, in order thereby to permit the plate 45 forming the lower holding plane B to pass with its projections 51 and 52 between the strippers 42 and 48.

The upstanding front edges of the strippers 42, 48, in the line of travel F, are disposed very close to the deflection shields 41, 47, so that the latter are completely cleared by the strippers. By virtue of the curving front faces and the clear circular path provided by the deflection shields 41, 47 in the transfer area 14, in which the latter are driven by a sprocket, the distance of the front edges of the strippers 42, 48 from the deflection shields 41, 47 can be kept constant. The space between the front edges and the deflection shields 41, 47 remains equal. Even when the conveyor links are carried in a straight line counter to the line of travel, it would be possible to maintain the distance between the then-planar face of the deflection shields 41, 47 and the strippers 42, 48. To achieve better stripping, the strippers 42, 48 can be spring-loaded. The strippers 42, 48 can be locked in the working position. To permit maintenance, this lock must be released. The strippers 42, 48 can, for example, then be swung out of the working position and be completely cleaned.

Instead of locking the strippers, it is also possible to mount the strippers resiliently so that the strippers can be opened against the force of the spring for cleaning. The strippers 42, 48 are comprised, for example, of spring steel.

In chopping operations in the field, the harvester 1 is driven as a front-end unit in a working direction F in the manner of a chopping machine configured especially as a self-powered chopping machine in the embodiment considered, with a gathering and conveying apparatus disposed on the left and right of the center of the chopping machine in an operating position (see FIG. 1) close to the ground and/or supported at least partially on the ground on skids or the like. As seen in the traveling and working direction F, the individual endless conveyors 10, 11 are set at a slight slant, so that their upper, table-like covers point downward at the front and upward at the rear. The two stalk and plant dividers 19 and 20 mounted on the outer end define the maximum working width of the harvester 1. The endless conveyor 10, 11 of each gathering and conveying apparatus 4, 5 moves in the direction of rotation U1, U2. Stalked plants 3 are caught by the drivers 31 in the form of hook-shaped counter-knives 32, 33 and cut off by the cooperation of the counter-knives 32, 33 with the knife 34 situated underneath the endless conveyor 10, 11 and then grasped in the gap 55 between the projections 51, 52 and 53, 54 of the conveying and guiding elements 25, 26. The stalks 3 are then in a slightly inclined position as represented in FIGS. 4 and 6, leaning counter to the direction of rotation U1, U2 and counter to the traveling and working direction F, and are carried in this position transversely of the line of travel F to a transfer and discharge area 14 of the gathering and conveying system 4, 5. By means of strippers 42, 48 located therein, the stalked plants 3 are released from the gaps 55 in the conveying and guiding elements 25, 26 and can thus be collected and chopped up by a processing machine in the nature of a cutting unit of the chopper.

In an alternative embodiment (FIG. 11 to FIG. 15), moving knives are disposed under the plane of rotation of the conveyors 10, 11 and are in the form of rotating disks 112, 113 in the embodiment. The disks 112, 113 are mounted for rotation on the frame 80, with respect to which the endless conveyors are moving. Instead of rotating disks, linear knives can be considered, which move back and forth lengthwise against one another. The rotating disks 112, 113 can be arrayed up to into the transfer area 14, in which the plants are carried to the inlet opening. Thus, equally good cutting conditions are created for stalks in the area of the vertical longitudinal central plane of the vehicle.

The rotating disks 112, 113 lie parallel to the plane of rotation of the conveyor system 4, 5 and are disposed directly underneath it on the frame 80. The rotating disks 112, 113 are at the same time mounted so as to overlap one another, the disks 112 in an upper plane and the disks 113 in a lower plane. The effective cutting areas thus form only a small sector of the rotating disks 112, 113, so that, in a plan view, the actual cutting edges present only a wavy line. Thus, an approximation to a rectilinear cutting apparatus is achieved. The disks 112, 113 are driven through intermeshing gears 127, which are mounted under the disks 112, 113 and are associated with the frames 80. In the marginal area, the gears 127 can likewise be driven at a transmission ratio through sprockets, which also drive the endless conveyor. It is also possible to uncouple the drives from the endless conveyors 10, 11 and from the rotating disks 112, 113. In any case, uncoupling can be achieved on the basis of the arrangement in separate planes, so that the knives 112, 113 can be replaced on the endless conveyors 10, 11.

The knives 112, 113 can be driven at a high rotary speed and cut the freestanding stalks. Also possible is cooperation with additional cutting means, which can be situated, in a lower plane of the conveyor system 4,5, close to the knives 112, 113.

Figure 18:
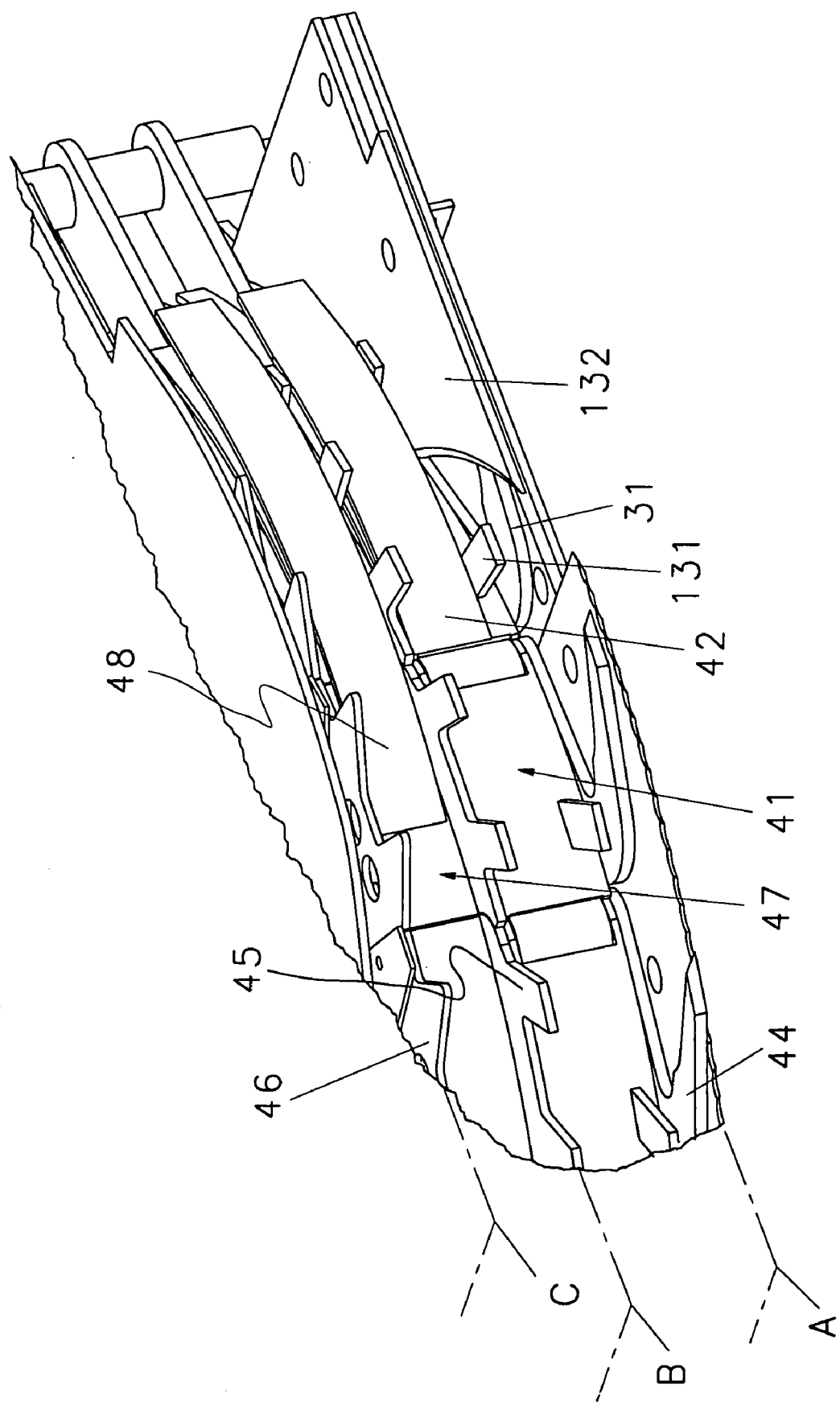
FIG. 18 is a view similar to that of FIG. 7 of an alternative embodiment of a fixed counter-knife in the transfer area.

In an improved embodiment (FIG. 16, FIG. 17), an additional driver 131 is provided, which is arranged closely above the driver 31 of cutting plane A, and its leading edge is substantially flush over the front edge of driver 31. Between the said drivers 31 and 131, there is a fixed counter-knife 132 (FIG. 18) in the transfer area 14, over and under which the drivers 31 and 132 closely pass. Thus, adhering plant parts, especially fibers of, for example, wilted leaves, are chopped up. Thus, such fibers are prevented from wrapping around the drivers 31, 131 thereby limiting the cutting and guiding ability of such drivers. The driver 131 can have inwardly pointing projections 133, by which it is held in recesses in the deflection shield 41 and is welded to the back of it, so that the front side is exactly flat and planar and can be made upstanding at right angles in the transition to the deflection shield 41, which permits very close intervals from the fixed counter-knife 132 and stripper 42.

What is claimed is:

1. A harvesting apparatus for harvesting stalked plants, comprising at least one circulating endless conveyor which leads cut stalks to a delivery area at an end of a working strand thereof for delivering harvested plants to an inlet opening of a farther processing apparatus, the endless conveyor comprising conveyor links articulated to one another, said conveyor links including outwardly pointing cutting means disposed on at least one cutting plane and outwardly pointing cut stalk holding means for holding the cut stalks disposed on at least one holding plane which is disposed above said at least one cutting plane, a forward portion of each of the conveyor links which faces outwardly in a direction of the cutting means and the cut stalk holding means, and which collectively comprises a front side of the endless conveyor, being structurally configured such that the front side of the endless conveyor is substantially closed to an opposed side thereto.

2. The harvesting apparatus according to claim 1, wherein said at least one holding plane includes upper and lower holding planes both being located above said cutting plane, on which respective first and second cut stalk holding means for holding the stalks are disposed.

3. The harvesting apparatus of claim 2, wherein the first cut stalk holding means of the upper holding plane are offset against a line of travel from the second cut stalk holding means of the lower holding plane in an area of the working strand of the endless conveyor.

4. The harvesting apparatus of claim 1, wherein the conveyor links of the endless conveyor are made each in integral form, in one piece or from parts permanently joined.

5. A harvesting apparatus for harvesting stalked plants, comprising at least one circulating endless conveyor which leads cut stalks to a delivery area at an end of a working strand thereof for delivering harvested plants to an inlet opening of a further processing apparatus, the endless conveyor comprising conveyor links articulated to one another, said conveyor links including outwardly pointing cutting means disposed on at least one cutting plane and outwardly pointing cut stalk holding means for holding the cut stalks disposed on at least one holding plane which is disposed above said at least one cutting plane, a forward portion of each of the conveyor links which faces outwardly in a direction of the cutting means and the cut stalk holding means, and which collectively comprises a front side of the endless conveyor, being structurally configured such that the front side of the endless conveyor is substantially closed to an opposed side thereto, a front face of each of the conveyor links being substantially closed by a first deflecting shield extending between the cutting plane and the lower holding plane and a second deflecting shield extending between the lower holding plane and the upper holding plane.

6. The harvesting apparatus of claim 5, wherein the deflection shields extend between joint axes of the conveyor links.

7. The harvesting apparatus of claim 5, wherein the deflection shields have a bulging shape and the deflection shields of adjacent ones of the conveyor links form, in the delivery area in which a turnabout of the endless conveyor takes place, a substantially continuous, kink-free curved path.

8. The harvesting apparatus of claim 1, further comprising a frame including a cutting knife carried thereon, said endless conveyor being held by said frame and movable relative thereto.

9. The harvesting apparatus of claim 8, wherein the endless conveyor includes a lower driver at said cutting plane which cooperates with the cutting knife as a counter-knife.

10. The harvesting apparatus of claim 1 further comprising at least one stripper cooperative with the front side of the endless conveyor, and with respect to which, the endless conveyor is relatively movable.

11. The harvesting apparatus of claim 10, wherein the at least one stripper is disposed in the delivery area of the endless conveyor.

12. A harvesting apparatus for harvesting stalked plants, comprising at least one circulating endless conveyor which leads cut stalks to a delivery area at an end of a working strand thereof for delivering harvested plants to an inlet opening of a further processing apparatus, the endless conveyor comprising conveyor links articulated to one another, said conveyor links including outwardly pointing cutting means disposed on at least one cutting plane and outwardly pointing cut stalk holding means for holding the cut stalks disposed on at least one holding plane which is disposed above said at least one cutting plane, a forward portion of each of the conveyor links which faces outwardly in a direction of the cutting means and the cut stalk holding means, and which collectively comprises a front side of the endless conveyor, being structurally configured such that the front side of the endless conveyor is substantially closed to an opposed side thereto, the harvesting apparatus further comprising at least one stripper cooperative with the front side of the endless conveyor, and with respect to which, the endless conveyor is relatively movable, the at least one stripper being configured as a substantially rigid body standing on edge, each said at least one stripper being disposed between at least one adjacent vertical pair of the at least one cutting plane and the at least one cut stalk holding plane of the endless conveyor.

13. A harvesting apparatus for harvesting stalked plants, comprising at least one circulating endless conveyor which leads cut stalks to a delivery area at an end of a working strand thereof for delivering harvested plants to an inlet opening of a further processing apparatus, the endless conveyor comprising conveyor links articulated to one another, said conveyor links including outwardly pointing cutting means disposed on at least one cutting plane and outwardly pointing cut stalk holding means for holding the cut stalks disposed on at least one holding plane which is disposed above said at least one cutting plane, a forward portion of each of the conveyor links which faces outwardly in a direction of the cutting means and the cut stalk holding means, and which collectively comprises a front side of the endless conveyor, being structurally configured such that the front side of the endless conveyor is substantially closed to an opposed side thereto, the harvesting apparatus further comprising at least one stripper cooperative with the front side of the endless conveyor, and with respect to which, the endless conveyor is relatively movable, the at least one stripper sweeping substantially completely at least one of a distance between the cutting plane and a holding plane and another distance between an adjacent pair of cut stalk holding planes comprised of the at least one holding plane.

14. A harvesting apparatus for harvesting stalked plants, comprising at least one circulating endless conveyor which leads cut stalks to a delivery area at an end of a working strand thereof for delivering harvested plants to an inlet opening of a further processing apparatus, the endless conveyor comprising conveyor links articulated to one another, said conveyor links including outwardly pointing cutting means disposed on at least one cutting plane and outwardly pointing cut stalk holding means for holding the cut stalks disposed on at least one holding plane which is disposed above said at least one cutting plane, a forward portion of each of the conveyor links which faces outwardly in a direction of the cutting means and the cut stalk holding means, and which collectively comprises a front side of the endless conveyor, being structurally configured such that the front side of the endless conveyor is substantially closed to an opposed side thereto, the harvesting apparatus further comprising at least one stripper cooperative with the front side of the endless conveyor, and with respect to which, the endless conveyor is relatively movable, the at least one stripper being held in the delivery area and extending forward with a free end thereof substantially in a line of travel and reaching into a curved turnaround area of the endless conveyor.

15. The harvesting apparatus of claim 14, wherein the at least one stripper is disposed on both sides of the inlet opening to the further processing apparatus and forms a lateral guiding surface for the cut stalks.

16. A harvesting apparatus for harvesting stalked plants, comprising at least one circulating endless conveyor which leads cut stalks to a delivery area at an end of a working strand thereof for delivering harvested plants to an inlet opening of a further processing apparatus, the endless conveyor comprising conveyor links articulated to one another, said conveyor links including outwardly pointing cutting means disposed on at least one cutting plane and outwardly pointing cut stalk holding means for holding the cut stalks disposed on at least one holding plane which is disposed above said at least one cutting plane, a forward portion of each of the conveyor links which faces outwardly in a direction of the cutting means and the cut stalk holding means, and which collectively comprises a front side of the endless conveyor, being structurally configured such that the front side of the endless conveyor is substantially closed to an opposed side thereto, the harvesting apparatus further comprising at least one stripper cooperative with the front side of the endless conveyor, and with respect to which, the endless conveyor is relatively movable, the at least one stripper being combined in one component for cooperation with two superimposed deflection shields.

17. A harvesting apparatus for harvesting stalked plants, comprising at least one circulating endless conveyor which leads cut stalks to a delivery area at an end of a working strand thereof for delivering harvested plants to an inlet opening of a further processing apparatus, the endless conveyor comprising conveyor links articulated to one another, said conveyor links including outwardly pointing cutting means disposed on at least one cutting plane and outwardly pointing cut stalk holding means for holding the cut stalks disposed on at least one holding plane which is disposed above said at least one cutting plane, a forward portion of each of the conveyor links which faces outwardly in a direction of the cutting means and the cut stalk holding means, and which collectively comprises a front side of the endless conveyor, being structurally configured such that the front side of the endless conveyor is substantially closed to an opposed side thereto, the harvesting apparatus further comprising at least one stripper cooperative with the front side of the endless conveyor, and with respect to which, the endless conveyor is relatively movable, the at least one stripper being comprised of spring steel.

18. A harvesting apparatus for harvesting stalked plants, comprising at least one circulating endless conveyor which leads cut stalks to a delivery area at an end of a working strand thereof for delivering harvested plants to an inlet opening of a further processing apparatus, the endless conveyor comprising conveyor links articulated to one another, said conveyor links including outwardly pointing cutting means disposed on at least one cutting plane and outwardly pointing cut stalk holding means for holding the cut stalks disposed on at least one holding plane which is disposed above said at least one cutting plane, a forward portion of each of the conveyor links which faces outwardly in a direction of the cutting means and the cut stalk holding means, and which collectively comprises a front side of the endless conveyor, being structurally configured such that the front side of the endless conveyor is substantially closed to an opposed side thereto, the harvesting apparatus further comprising at least one stripper cooperative with the front side of the endless conveyor, and with respect to which, the endless conveyor is relatively movable, the at least one stripper being yieldingly supported by spring mounting.

19. A harvesting apparatus for harvesting stalked plants, comprising at least one circulating endless conveyor which leads cut stalks to a delivery area at an end of a working strand thereof for delivering harvested plants to an inlet opening of a further processing apparatus, the endless conveyor comprising conveyor links articulated to one another, said conveyor links including outwardly pointing cutting means disposed on at least one cutting plane and outwardly pointing cut stalk holding means for holding the cut stalks disposed on at least one holding plane which is disposed above said at least one cutting plane, a forward portion of each of the conveyor links which faces outwardly in a direction of the cutting means and the cut stalk holding means, and which collectively comprises a front side of the endless conveyor, being structurally configured such that the front side of the endless conveyor is substantially closed to an opposed side thereto, said at least one holding plane including a first holding plane, each conveyor link having at least a first driver in said first holding plane which is part of a flat body lying in a conveying and guiding plane, the flat body having at least one projection forming the at least first driver which projects outwardly across a direction of rotation of the endless conveyor.

20. The harvesting apparatus of claim 19, wherein said at least one holding plane includes a second holding plane each conveyor link at least a second driver in said second holding plane which is part of an other flat body lying in the conveying and guiding plane, the other flat body having at least one other projection forming the at least second driver which projects outwardly across the direction of rotation of the endless conveyor.

21. The harvesting apparatus of claim 20, wherein at least one of the flat body and the other flat body has two forwardly extending projections.

22. The harvesting apparatus of claim 21, wherein approximately equal intervals are formed between the projections of said flat body and the projections of an adjacent flat body lying in a same plane.

23. The harvesting apparatus of claim 20, wherein the flat body and the other flat body each have two projections.

24. The harvesting apparatus of claim 20, wherein the projections of at least one of said first and second holding planes are configured as flat bodies extended in a parallelogram-like manner.

25. The harvesting apparatus of claim 20, wherein the projections expand counter to a line of travel and thus a distance between the projections decreases in an area of the working strand counter to the line of travel.

26. The harvesting apparatus of claim 20, wherein, in the lower holding plane, substantially parallelogram-shaped projections are formed and, in the upper holding plane, triangular projections of the flat bodies are formed, such that the cut stalks can be held in an acute angle between the parallelogram-shaped projection and a front edge of the flat body and in another angle between the triangular projection and the front edge of the flat body of the upper holding plane.

27. The harvesting apparatus of claim 26, wherein a space for the cut stalks, which is formed by the projections of the upper and lower holding planes acting as holding parts, narrows counter to the line of travel.

28. The harvesting apparatus of claim 20, wherein a front edge of the flat bodies is of substantially arcuate shape between the projections.

29. The harvesting apparatus of claim 20, wherein the flat bodies have at one end, parallel to the direction of rotation, a substantially arcuate broadening and, at an other end, a complementary recess, the flat bodies of adjacent ones of the conveyor links engaging one another with slight clearance in the assembled state.

30. A harvesting apparatus for harvesting stalked plants, comprising at least one circulating endless conveyor which leads cut stalks to a delivery area at an end of a working strand thereof for delivering harvested plants to an inlet opening of a further processing apparatus, the endless conveyor comprising conveyor links articulated to one another, said conveyor links including outwardly pointing cutting means disposed on at least one cutting plane and outwardly pointing cut stalk holding means for holding the cut stalks disposed on at least one holding plane which is disposed above said at least one cutting plane, a forward portion of each of the conveyor links which faces outwardly in a direction of the cutting means and the cut stalk holding means, and which collectively comprises a front side of the endless conveyor, being structurally configured such that the front side of the endless conveyor is substantially closed to an opposed side thereto, a flat body bearing a driver configured as a counter-knife having, parallel to a direction of rotation of the endless conveyor, an arcuate segment at one end and, at an other end, a complementary recess, and adjacent flat bodies mating with one another with slight free play.

31. A harvesting apparatus for harvesting stalked plants, comprising at least one circulating endless conveyor which leads cut stalks to a delivery area at an end of a working strand thereof for delivering harvested plants to an inlet opening of a farther processing apparatus, the endless conveyor comprising conveyor links articulated to one another, said conveyor links including outwardly pointing cutting means disposed on at least one cutting plane and outwardly pointing cut stalk holding means for holding the cut stalks disposed on at least one holding plane which is disposed above said at least one cutting plane, a forward portion of each of the conveyor links which faces outwardly in a direction of the cutting means and the cut stalk holding means, and which collectively comprises a front side of the endless conveyor, being structurally configured such that the front side of the endless conveyor is substantially closed to an opposed side thereto, a front face of each of the conveyor links being substantially closed by a first deflecting shield and including a flat body lying in a conveying and guiding plane, a curvature of the deflection shields as well as a curvature of a leading edge of the flat body being configured arcuately.

32. The harvesting apparatus of claim 28, wherein the radius of curvature of the arcuate shape is substantially the same as a radius of one of an idle sprocket and a drive sprocket disposed near the delivery area of the endless conveyor at the processing apparatus.

33. The harvesting apparatus of claim 1, wherein each of the conveyor links of the endless conveyor is comprised of two sections locked to one another, said two sections including upper and lower sections.

34. The harvesting apparatus of claim 1, wherein adjacent links of said conveyor links have a swiveling connection.

35. The harvesting apparatus of claim 34, wherein the swiveling connection between said adjacent links of said conveyor links includes a pin carried on the upper section on a one of said adjacent links and a bearing to receive the pin in the lower section of an adjacent one of said adjacent links.

36. The harvesting apparatus of claim 35, wherein said bearing is one of a sealed rolling bearing and a grooved ball bearing for the swiveling connection.

37. The harvesting apparatus of claim 1, wherein:
said conveyor links are comprised of flat bodies lying in a conveying and guiding plane, said flat bodies including arcuate segments; and the arcuate segments of the flat bodies form a covering of bearings via which adjacent ones of said conveyer links are swivelingly connected.

38. The harvesting apparatus of claim 33, wherein the sections of a conveyor link are bolted together.

39. A harvesting apparatus for harvesting stalked plants, comprising at least one circulating endless conveyor which leads cut stalks to a delivery area at an end of a working strand thereof for delivering harvested plants to an inlet opening of a further processing apparatus, the endless conveyor comprising conveyor links articulated to one another, said conveyor links including outwardly pointing cutting means disposed on at least one cutting plane and outwardly pointing cut stalk holding means for holding the cut stalks disposed on at least one holding plane which is disposed above said at least one cutting plane, a forward portion of each of the conveyor links which faces outwardly in a direction of the cutting means and the cut stalk holding means, and which collectively comprises a front side of the endless conveyor, being structurally configured such that the front side of the endless conveyor is substantially closed to an opposed side thereto, each of the conveyor links of the endless conveyor being comprised of two sections locked to one another, said two sections including upper and lower sections, the upper section comprising flat bodies with projections forming the holding planes and with a deflection shield therebetween.

40. A harvesting apparatus for harvesting stalked plants, comprising at least one circulating endless conveyor which leads cut stalks to a delivery area at an end of a working strand thereof for delivering harvested plants to an inlet opening of a further processing apparatus, the endless conveyor comprising conveyor links articulated to one another, said conveyor links including outwardly pointing cutting means disposed on at least one cutting plane and outwardly pointing cut stalk holding means for holding the cut stalks disposed on at least one holding plane which is disposed above said at least one cutting plane, a forward portion of each of the conveyor links which faces outwardly in a direction of the cutting means and the cut stalk holding means, and which collectively comprises a front side of the endless conveyor, being structurally configured such that the front side of the endless conveyor is substantially closed to an opposed side thereto, each of the conveyor links of the endless conveyor being comprised of two sections locked to one another, said two sections including upper and lower sections, the lower section comprising counter-knives, configured as drivers, and a deflection shield.

41. The harvesting apparatus of claim 1, wherein the endless conveyor has projections on the conveyor links for engaging a drive.

42. A harvesting apparatus for harvesting stalked plants, comprising at least one circulating endless conveyor which leads cut stalks to a delivery area at an end of a working strand thereof for delivering harvested plants to an inlet opening of a further processing apparatus, the endless conveyor comprising conveyor links articulated to one another, said conveyor links including outwardly pointing cutting means disposed on at least one cutting plane and outwardly pointing cut stalk holding means for holding the cut stalks disposed on at least one holding plane which is disposed above said at least one cutting plane, a forward portion of each of the conveyor links which faces outwardly in a direction of the cutting means and the cut stalk holding means, and which collectively comprises a front side of the endless conveyor, being structurally configured such that the front side of the endless conveyor is substantially closed to an opposed side thereto, the endless conveyor having projections on the conveyor links for engaging a drive, the projections being formed by sleeve bodies forming a bearing.

43. The harvesting equipment of claim 42, further comprising at least two sprockets lying opposite one another for driving the at least one endless conveyor, said at least two sprockets engaging the projections and effecting rotation of the at least one endless conveyor.

44. The harvesting apparatus of claim 43, wherein:
the endless conveyor includes a driving wheel at the delivery area; and
a turning around of the endless conveyor takes place in the delivery area to the further processing apparatus.

45. The harvesting apparatus of claim 1, wherein said at least one conveyor includes additional conveyors rotating about a common axis of rotation mounted in an area of a drive sprocket.

46. The harvesting apparatus of claim 1, wherein the conveyor links of the endless conveyor are guided in a movement thereof between driving and idle sprockets.

47. The harvesting apparatus of claim 1, wherein the conveyor links each includes engaging means provided on a back thereof aligned parallel to a direction of rotation of the endless conveyor and which are receivable into a corresponding recess of a guiding strip.

48. A harvesting apparatus for harvesting stalked plants, comprising at least one circulating endless conveyor which leads cut stalks to a delivery area at an end of a working strand thereof for delivering harvested plants to an inlet opening of a further processing apparatus, the endless conveyor comprising conveyor links articulated to one another, said conveyor links including outwardly pointing cutting means disposed on at least one cutting plane and outwardly pointing cut stalk holding means for holding the cut stalks disposed on at least one holding plane which is disposed above said at least one cutting plane, a forward portion of each of the conveyor links which faces outwardly in a direction of the cutting means and the cut stalk holding means, and which collectively comprises a front side of the endless conveyor, being structurally configured such that the front side of the endless conveyor is substantially closed to an opposed side thereto, the conveyor links each including engaging means provided on a back thereof aligned parallel to a direction of rotation of the endless conveyor and which are receivable into a corresponding recess of a guiding strip, the engaging means being formed by an upturned projection which includes one of a sliding and rolling bearing to guide said upturned projection in the recess.

49. The harvesting apparatus of claim 1, wherein said at least one endless conveyor includes two endless conveyors pointing laterally outward and lying essentially next to one another in operation.

50. The harvesting apparatus of claim 1, further comprising:
a frame on which the endless conveyor is held; and
leaf and plant lifters carried on said frame, said lifter comprising a pyramid-shaped parting point.

51. The harvesting apparatus of claim 50, wherein each said parting point includes a guiding hook which comprises an arm pointing substantially in a conveying direction.

52. The harvesting apparatus of claim 51, wherein the arm extends up to an adjacent leaf and plant lifter.

53. The harvesting apparatus of claim 51, wherein the guiding hook is resiliently mounted.

54. The harvesting apparatus of claim 53, wherein a spring force of the guiding hook is put under tension against a line of travel so as to form a channel between a guiding plane and the working strand of the endless conveyor to carry the stalked plants counter to the line of travel.

55. The harvesting apparatus of claim 1, further comprising movable cutting knives separate from the endless conveyors, which are disposed underneath the endless conveyor.

56. The harvesting apparatus of claim 55, wherein the movable cutting knives are configured as revolving disks and are disposed in a plane situated directly under a plane of movement of the endless conveyor and parallel to a path of movement thereof.

57. The harvesting apparatus of claim 56, wherein the working strand of the endless conveyors sweeps over a transport area running transversely across a line of travel and the moving cutting knives configured as revolving disks are arranged side by side and staggered underneath said transport area.

58. The harvesting apparatus of claim 55, wherein the cutting means cooperate with the moving cutting knives.

59. The harvesting apparatus of claim 55, wherein the moving cutting knives freely sever the stalked plants.

60. The harvesting apparatus of claim 55, wherein the moving cutting knives are fixedly journaled with respect to the frame holding the endless conveyors.

61. The harvesting apparatus of claim 60, wherein the moving cutting knives are configured as revolving disks which run in two planes and which overlap one another.

62. The harvesting apparatus of claim 1, further comprising a fixed counter-knife in the delivery area under which a driver which is located at said at least one cutting plane closely passes and over which an additional driver situated above and parallel to the driver closely passes.

63. A harvesting apparatus for harvesting stalked plants, comprising at least one circulating endless conveyor which leads cut stalks to a delivery area at an end of a working strand thereof for delivering harvested plants to an inlet opening of a further processing apparatus, the endless conveyor comprising conveyor links articulated to one another, said conveyor links including outwardly pointing cutting means disposed on at least one cutting plane and outwardly pointing cut stalk holding means for holding the cut stalks disposed on at least one holding plane which is disposed above said at least one cutting plane, a forward portion of each of the conveyor links which faces outwardly in a direction of the cutting means and the cut stalk holding means, and which collectively comprises a front side of the endless conveyor, being structurally configured such that the front side of the endless conveyor is substantially closed to an opposed side thereto, the harvesting apparatus further comprising a fixed counter-knife in the delivery area under which a driver which is located at said at least one cutting plane closely passes and over which an additional driver situated above and parallel to the driver closely passes, a front face of each of the conveyor links being substantially closed by at least one deflecting shield, and the additional driver being affixed to the conveyor links of the endless conveyor by means of projections fastened on a back thereof and reaching through the at least one deflection shield.

* * * * *